(12) United States Patent
Chen et al.

(10) Patent No.: US 7,083,693 B2
(45) Date of Patent: Aug. 1, 2006

(54) APPARATUS AND METHOD FOR FIBER BATT FOAM ENCAPSULATION

(75) Inventors: Liang Chen, New Albany, OH (US); Daojie Dong, Westerville, OH (US); Brian W. Bland, Newark, OH (US)

(73) Assignee: Owens Corning Fiberglas Technolgoy, Inc., Summit, IL (US)

(*) Notice: Subject to any disclaimer, the term of this patent is extended or adjusted under 35 U.S.C. 154(b) by 159 days.

(21) Appl. No.: 10/789,208

(22) Filed: Feb. 27, 2004

(65) Prior Publication Data
US 2005/0189059 A1    Sep. 1, 2005

(51) Int. Cl.
*B32B 5/20* (2006.01)
*B32B 5/28* (2006.01)
*B32B 31/12* (2006.01)

(52) U.S. Cl. .................. 156/79; 156/213; 427/258; 427/261; 427/269; 427/358; 427/384; 427/389.9; 264/45.8; 428/74; 428/76

(58) Field of Classification Search .............. None
See application file for complete search history.

(56) References Cited

U.S. PATENT DOCUMENTS

| 4,188,355 A | 2/1980 | Graham et al. |
| 4,990,370 A * | 2/1991 | Terry et al. ................. 427/209 |
| 5,211,988 A | 5/1993 | Morton |
| 5,514,417 A | 5/1996 | Matthews et al. |
| 5,549,753 A * | 8/1996 | Matthews et al. .......... 118/316 |
| 5,567,504 A | 10/1996 | Schakel et al. |
| 5,908,501 A | 6/1999 | Pucillo |
| 6,000,437 A | 12/1999 | Ponder et al. |
| 6,231,927 B1 | 5/2001 | Ruid |
| 2001/0033926 A1* | 10/2001 | Matthews et al. ....... 428/316.6 |
| 2003/0031854 A1 | 2/2003 | Kajander et al. |
| 2003/0032350 A1 | 2/2003 | Kajander et al. |

* cited by examiner

*Primary Examiner*—Sam Chuan Yao
(74) *Attorney, Agent, or Firm*—Ingersoll Eckert; Maria C. Gasaway

(57) ABSTRACT

Disclosed is an apparatus and a method for at least partially encapsulating a fiber batt or other highly porous substrate by applying a polymeric foam layer to one or more surfaces of the fiber batt. The foam application assemblies are arranged and configured to extrude a polymeric foam or a foaming mixture onto the surface(s) of the fiber batt to be coated. A combination of foam application assemblies may be provided in either fixed or moveable configurations for coating one or more sides of the fiber batt. The encapsulation of the fiber batt may also include a premanufactured material layer on one or more surfaces that may be exposed or may also be encapsulated below the polymeric foam layer.

31 Claims, 21 Drawing Sheets

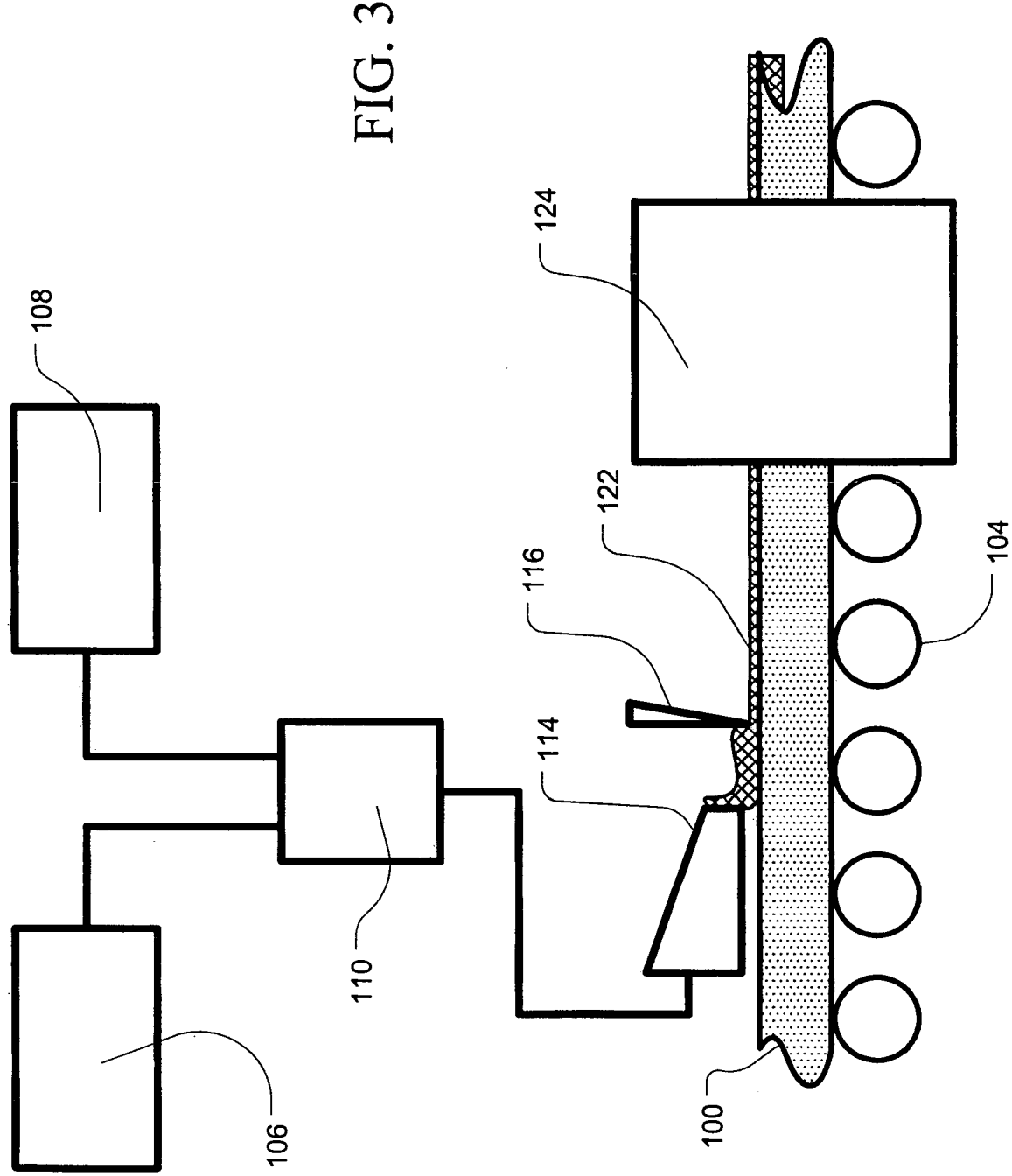

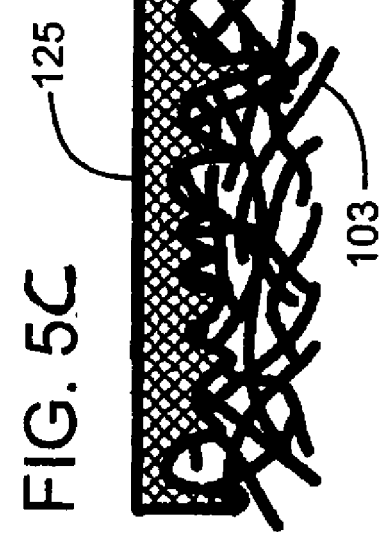
FIG. 5C
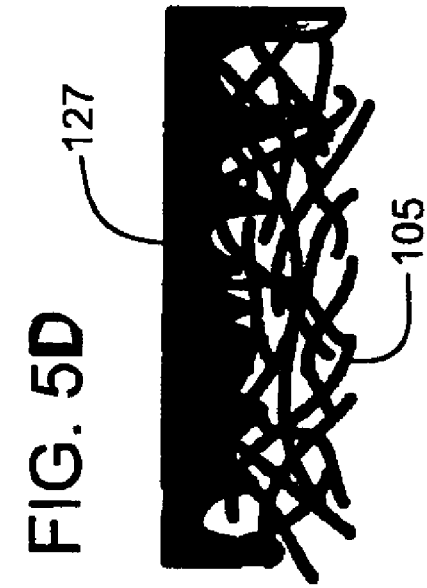
FIG. 5D
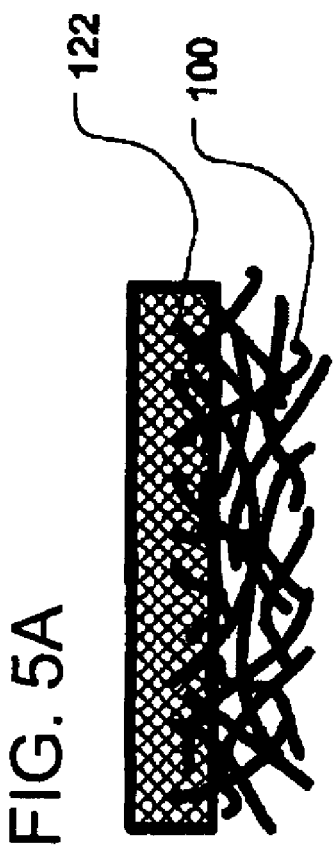
FIG. 5A
FIG. 5B

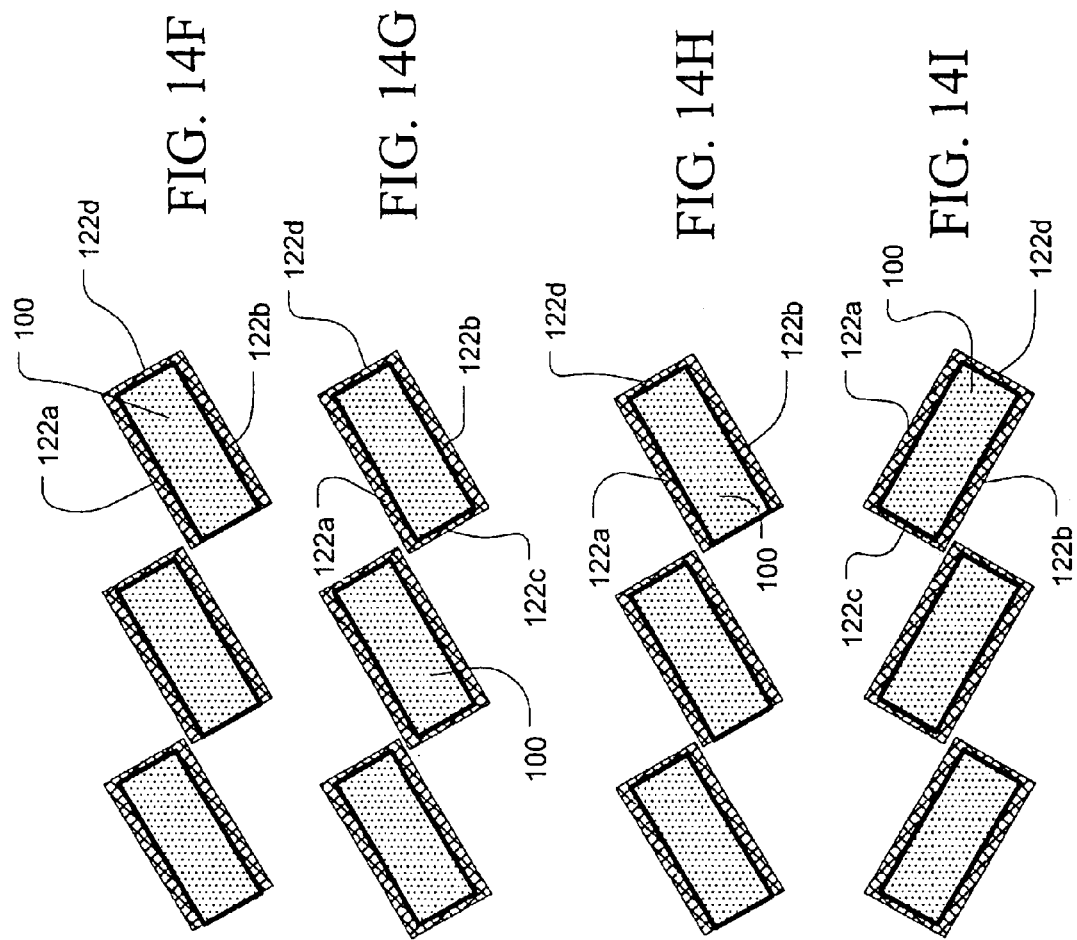

APPARATUS AND METHOD FOR FIBER BATT FOAM ENCAPSULATION

TECHNICAL FIELD AND INDUSTRIAL APPLICABILITY OF THE INVENTION

The present invention relates to an apparatus for applying a polymeric foam coating to a substrate, typically a fiber batt, in order to encapsulate the substrate either partially or substantially completely. The foam encapsulation may be applied in combination with other films, sheet materials and facing materials, as desired.

BACKGROUND OF THE INVENTION

Fibrous insulation is typically manufactured by fiberizing a molten composition of polymer, glass or other minerals and spinning fine fibers from a fiberizing apparatus and depositing the fibers on a collecting conveyor to form a batt or a blanket. Although mineral fibers, such as glass fibers, are typically used in insulation products, depending on the particular application organic fibers, such as polypropylene, polyester and multicomponent fibers may be used singly or in combination with mineral fibers.

Most fibrous insulation products also incorporate a binder to bond the fibers together where they contact each other within the batt or sheet to form a three dimensional network. This network structure provides resiliency that allows the insulation product to recover a substantial portion of its thickness after being compressed. The binder also provides improved stiffness and handleability. During the manufacturing process the insulation products are typically formed into a pack and cut to provide batts which are sized to be compatible with standard construction practices. Some insulation products also incorporate a facing or an encapsulating material on at least one of the major surfaces to improve the performance and/or the handling of the batt. In many cases the facing or encapsulating material includes a vapor barrier on at least one major surface, while in other insulation products, such as binderless products, the facing or encapsulating material may significantly improve the product integrity and durability.

Insulation products incorporating a vapor barrier are commonly used to insulate wall, floor or ceiling cavities that separate a warm moist space, typically a living or work spaces, from a cold area, typically the exterior, crawl space, or ground. In such applications, the vapor barrier is preferably placed adjacent the warm, moist area to prevent warm moist air from diffusing toward the cold space where it would cool and condense within the insulation. Such a situation would result in a damp insulation product that cannot perform at its designed efficiency. In predominately warm moist climates, however, it is not uncommon to reverse the typical installation in order to prevent vapor from entering the insulation cavity and approaching an air conditioned space and condensing.

There are, however, some applications that require an insulation product that does not incorporate or provide a vapor barrier, but rather allows water vapor to pass through fairly readily. For example, insulation products designed and intended for installation over existing attic insulation should not include a vapor barrier. Similarly, insulation products for wall cavities that have a separate full-wall vapor barrier, such as a polyethylene film, applied over the insulation product.

A number of methods for encapsulating fibrous batts for improved handling properties are known. For example, U.S. Pat. No. 5,277,955 to Schelhorn et al. discloses an encapsulated batt in which the encapsulation material is adhered to the batt with an adhesive applied in longitudinal stripes, or in patterns such as dots, or in an adhesive matrix. The Schelhorn patent also discloses that an alternative method of attachment is for the adhesive layer to be an integral part of the encapsulation layer, which, when softened, bonds to the fibers in the batt and is hereby incorporated, in its entirety, by reference.

U.S. Pat. No. 5,733,624 to Syme et al. discloses a mineral fiber batt impregnated with a coextruded polymer layering system. U.S. Pat. No. 5,746,854 to Romes et al. discloses a method for impregnating a mineral fiber batt with a coextruded film in which at least the coextruded film is heated before being applied to the fiber batt. The heat energy necessary to achieve the necessary degree of heating may be transferred primarily by conduction. The coextruded film passes over a heated cylinder or through radiant infrared heaters to warm the film and soften one layer of the coextruded film. Attaching the coextruded film in this manner has some disadvantages in that the particular heating process cannot be abruptly terminated or quickly varied due to the large thermal mass provided by the heated cylinder. In addition, the heated cylinder does not provide for selectively heating portions of the coextruded film to different temperatures. These patents are hereby incorporated, in their entirety, by reference.

Many traditional vapor barriers for insulation products comprised a layer of kraft paper or a foil facing with an asphalt adhesive layer. The asphalt layer was generally applied to the facing in molten form and pressed against the fibrous insulation material. The asphalt cools to bond the facing material to the fibrous batt. During cold weather installations, working with an asphalt/kraft paper faced fiber batt may be complicated by the increased brittleness of the asphalt adhesive layer. Conversely, during warm weather installations, the asphalt material will tend to soften and become sticky and more likely to foul cutting tools.

U.S. Pat. No. 6,357,504 to Patel et al. provided an alternative means for attaching a facing layer to a fibrous batt in which the facing comprises a coextruded polymer film including both a barrier layer and a bonding layer, with the bonding layer having a softening point lower than the softening point of the barrier layer. The bonding layer could comprise a range of materials including ethylene N-butyl acrylate, ethylene methyl acrylate ethylene ethyl acrylate, low density polyethylene (LDPE) and ethylene vinyl acetate, both singularly and in combination. Accordingly, when the facing is heated to a temperature above the softening point of the bonding layer, but below the softening point of the barrier layer, the facing may be adhered to the batt as the bonding layer attaches to the fibers. This patent is hereby incorporated, in its entirely, by reference.

In addition to facing layers provided on one or more surfaces of a fibrous batt, some prior art applications provide for forming a layer to improve the tactility of the insulation product during the handling and mounting, reduce or eliminate the release of fibers before, during or after mounting and improved tensile strength. One such method is disclosed in U.S. Pat. No. 6,203,646 to Gundberg et al. in which the encapsulating layer is formed directly on the surface of the fiber batt by forming a thermoplastic polymer melt and distributing fibers formed from the polymer melt onto the fiber batt. In this method, the adhesive characteristics of the molten and partially molten thermoplastic polymers is used to adhere the layer to the underlying fibers without the use of any additional binder or adhesive composition. This patent is hereby incorporated, in its entirety, by reference.

Another method and apparatus for providing a melt blown encapsulating layer on a fiber batt is provided in U.S. Pat. No. 5,501,872 to Allen et al. in which a six-sided fibrous batt is coated with a nonwoven polymeric material by passing the batt sequentially through three coating stations. Four sides of the batt are coated in the first two stations and, after the batt is turned 90°, the final two sides are coated to completely encapsulate the batt in a fibrous nonwoven coating layer. This patent is hereby incorporated, in its entirety, by reference.

There remains a need for improved methods for encapsulating insulation products to enhance their handling and performance encapsulation methods.

SUMMARY OF THE INVENTION

The invention is directed, in part, to an apparatus and a method for manufacturing an insulation product comprising an elongated fibrous batt with a polymeric foam encapsulating layer and, optionally, a vapor barrier layer on one or more surfaces of the fibrous batt.

Exemplary embodiments of the apparatus accommodate a method of forming an encapsulated fiber batt having two major surfaces, typically a top and bottom surface, and two minor or side surfaces with fiber batt oriented so that the major surfaces have a substantially horizontal orientation. The fiber batt is conveyed past at least one foam application assembly, with each foam application assembly being arranged and configured to apply a layer of foam or a foaming mixture to a surface of the fiber batt. A combination of foam application assemblies may be provided in either fixed or moveable configurations for coating one or more sides of fiber batts of various heights and widths.

Another exemplary embodiment of the invention provides for the attachment of a cellulosic polymer or metallic facing or vapor retarding layer to one or more surfaces of the fiber batt and subsequently coating the remaining surface(s) of the fiber batt with an encapsulating foam layer using the apparatus and methods described herein. The facing or vapor retarding layer may be attached to one of the major surfaces of the fiber batt and may be sized so as to extend beyond the perimeter of the major surface to provide attachment means for fiber batt installation or for covering additional portions of the fiber batt surface, particularly the minor surfaces.

The facing or vapor retarding layer may be attached to the fiber batt in any conventional manner, including, for example, applying a discontinuous layer or pattern of an adhesive to one surface of the vapor retarding layer and then forcing the first surface of the vapor retarding layer against a major surface of the fiber batt using rollers, belts or other devices capable of an application time period sufficient to allow the facing or vapor retarding layer to become adhered to the fiber batt by the adhesive. Hot-melt adhesives are generally suitable for such applications and may be applied by spraying, foam application or other conventional means.

The foregoing and other objectives of the present invention will become more apparent from the detailed description provided below. However, it should be understood that the detailed description and specific examples, while indicating preferred embodiments of the invention, are given by way of illustration only, and that various changes and modifications within the spirit and scope of the invention will be apparent to those skilled in the art when guided by the detailed disclosure.

BRIEF DESCRIPTION OF THE DRAWINGS

The above and other features and advantages of the present invention will become more apparent by describing in detail preferred embodiments thereof with reference to the attached drawings in which:

FIG. 3 illustrates an alternative embodiment of the basic assembly for forming an encapsulating foam layer to a surface of a fiber batt in which a layer of foam is applied to the surface of the batt and passed along a blade or knife;

FIG. 5A–5D illustrates various exemplary modes of interaction between the applied foam layer and the underlying fiber batt;

These figures are for the purpose of illustration only and are not, therefore, drawn to scale. The relative sizing and orientation of the various structural elements may have been exaggerated, simplified and/or otherwise modified to improve the clarity of the drawings with respect to the written description and should not be interpreted as unduly limiting the scope of the invention.

DETAILED DESCRIPTION OF EXEMPLARY EMBODIMENTS

Figure 1:
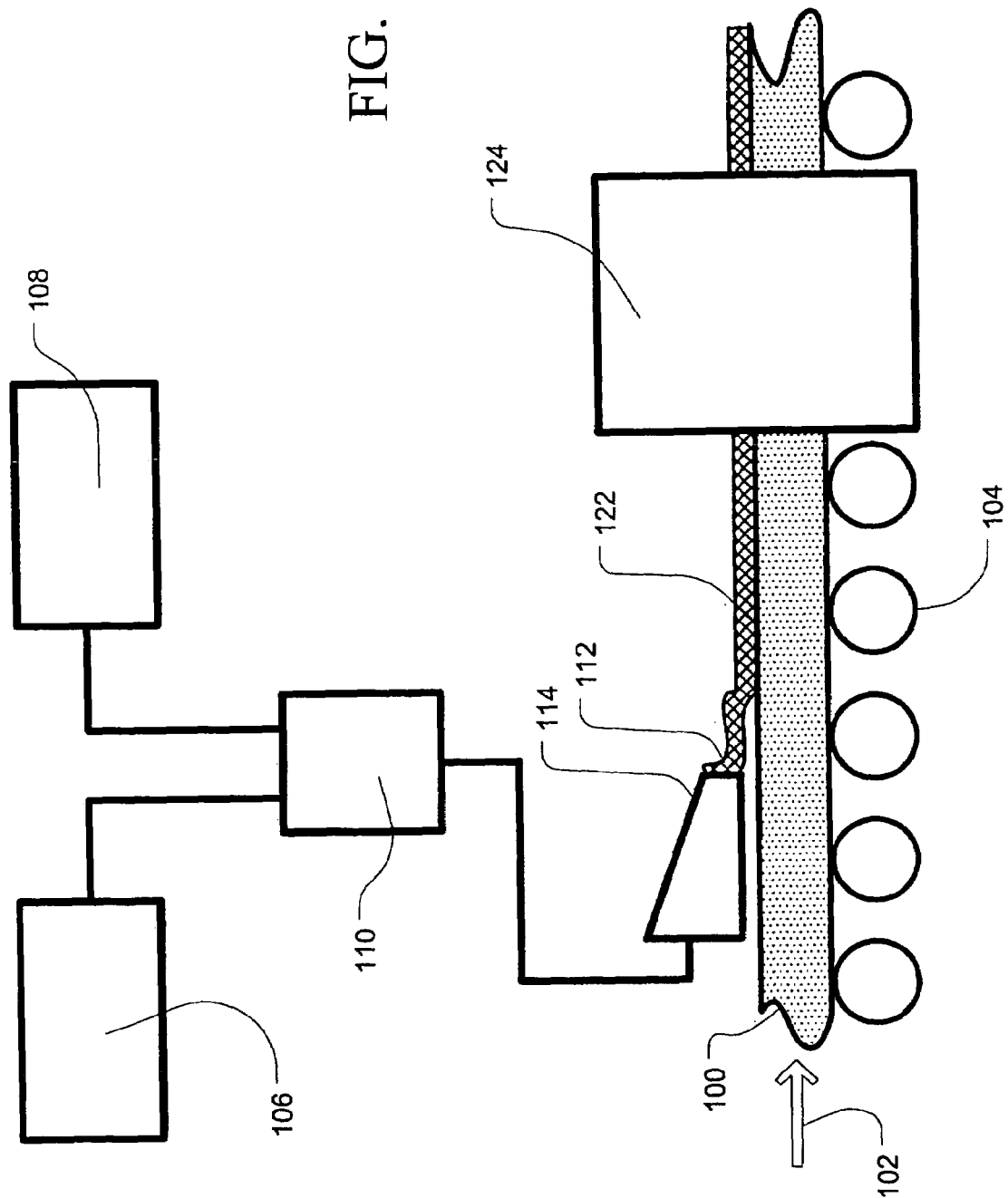
FIG. 1 illustrates an exemplary embodiment of the basic assembly for forming an encapsulating foam layer to a surface of a fiber batt in which a layer of foam is applied to the surface of the batt.

As illustrated in FIG. 1, an exemplary embodiment of an apparatus for practicing the invention provides for the application of an encapsulating foam layer on or near a surface of a fiber batt 100. The fiber batt 100 is conveyed through the apparatus in a direction 102 through the use of one or more types of conveying means such as rollers 104 or belts that can be configured to support and/or advance the fiber batt. The apparatus may also include a polymer resin reservoir, silo or other storage means 106, 108 from which one or more polymeric solutions or other raw materials may be delivered to a foam mixer or generator 110 or other device for producing a polymeric foaming mixture 112 of the desired composition and properties. A variety of thermoset and thermoplastic polymer compositions may be utilized in the present invention including, for example, any water soluble or dispersible thermoset or thermoplastic polymer. Exemplary thermoset polymers include those phenolic binders, urea formaldehyde binders, urea extended phenolic binders, polycarboxylic based binders, styrene butadiene and natural rubbers that are water soluble or readily dispersible as crosslinkable prepolymers. Similarly, exemplary thermoplastic polymers include polyvinyl chloride (PVC), polyethylenes (PE), polypropylenes (PP), poly (ethylene-maleic acid) co-polymers, poly(styrene-maleic acid) co-polymers, polyvinyl alcohols (PVA), ethylene/vinyl acetate (EVA), ethylene-propylene copolymers, polyesters, polyethylene terephthalates (PET), nylon polyacrylic acids, polyvinyl acetates, as well as salts and emulsions thereof The polymeric foam composition may also include one or more additives such as lubricants, dust suppressing agents, dyes, flame retardants, fillers, microcapsules, coupling agents, catalysts, surfactants, wetting agents and moisture repelling agents. Suitable lubricants include, for example glycol, polyethylene glycol, mineral oil and emulsions thereof.

The apparatus may also be arranged and configured to apply different materials and/or different layer thicknesses on different surfaces of the fiber batt to produce encapsulated batt products having a combination of properties that are desirable for particular manufacturing processes and/or final applications. For example, one or more major surfaces may be coated with a tough, generally impermeable layer that will resist cracking and delamination during rolling and compressing operations while one or more of the remaining surfaces may be coated with a more permeable layer to permit gas to escape easily from the fiber batt as it is compressed and enhance thickness recovery during installation of the final product.

The polymeric solution(s) may then be supplied to a foam generator or mixer 110 in which the polymeric solutions may be combined with one or more additives and agitated vigorously to produce a foam composition having the desired properties. Depending on the particular polymeric solution(s) selected and the nature of the desired foam, the foam generator or mixer 110 may employ high shear mixing, counter-current flows, gas injection and/or highly turbulent flows to achieve the desired degree of mixing and foaming actions to produce a foam mixture, preferably comprising at least 50 wt % solids.

As illustrated in FIG. 1, the foaming mixture 112 from foam generator 110 can then be directed to an applicator 114 from which it is extruded, typically through a slot die, directly onto an adjacent surface of the fiber batt where it become foam layer 122. The die slot may be fixed, or may be controlled within a sizing range to provide for process adjustments during continuous operation of the encapsulating equipment. Depending on the foam application conditions, the foam composition and thickness, and the intended use of the encapsulated fiber batt, it is anticipated that typical foam layer could be applied at rates sufficient to produce foam layers of between about 1 $g/m^2$ and about 200 $g/m^2$. The coated fiber batt will then typically be passed through at least one drying/curing apparatus 124 to dry or set the foam depending on the particular foam composition. The drying/curing apparatus 124 will typically combine a combination of heating and evacuation to remove excess moisture or other solvents to dry and/or cure the foam. The necessary heating may be applied to the coated fiber batt using one or more methods including forced hot air, natural convection, infrared or other radiant heating, microwave or radio frequency (RF) heating, either in combination or sequentially.

Similarly, the orientation and spacing of the applicator(s) 114 with respect to the fiber batt 100 will affect the properties of the resulting encapsulating foam layer. Further, the foam applicator(s) 114 may be generally fixed with respect to the fiber batt 100 or may provide for a range of motion including one or more of linear, rotational, orbital, radial and/or angular displacement relative to the fiber batt and each other. Some relative motion of the foam applicator(s) 114 and the fiber batt 100 may be especially helpful in accommodating fiber batts having a range of thickness or foam compositions of different viscosity and thickness.

Figure 2:
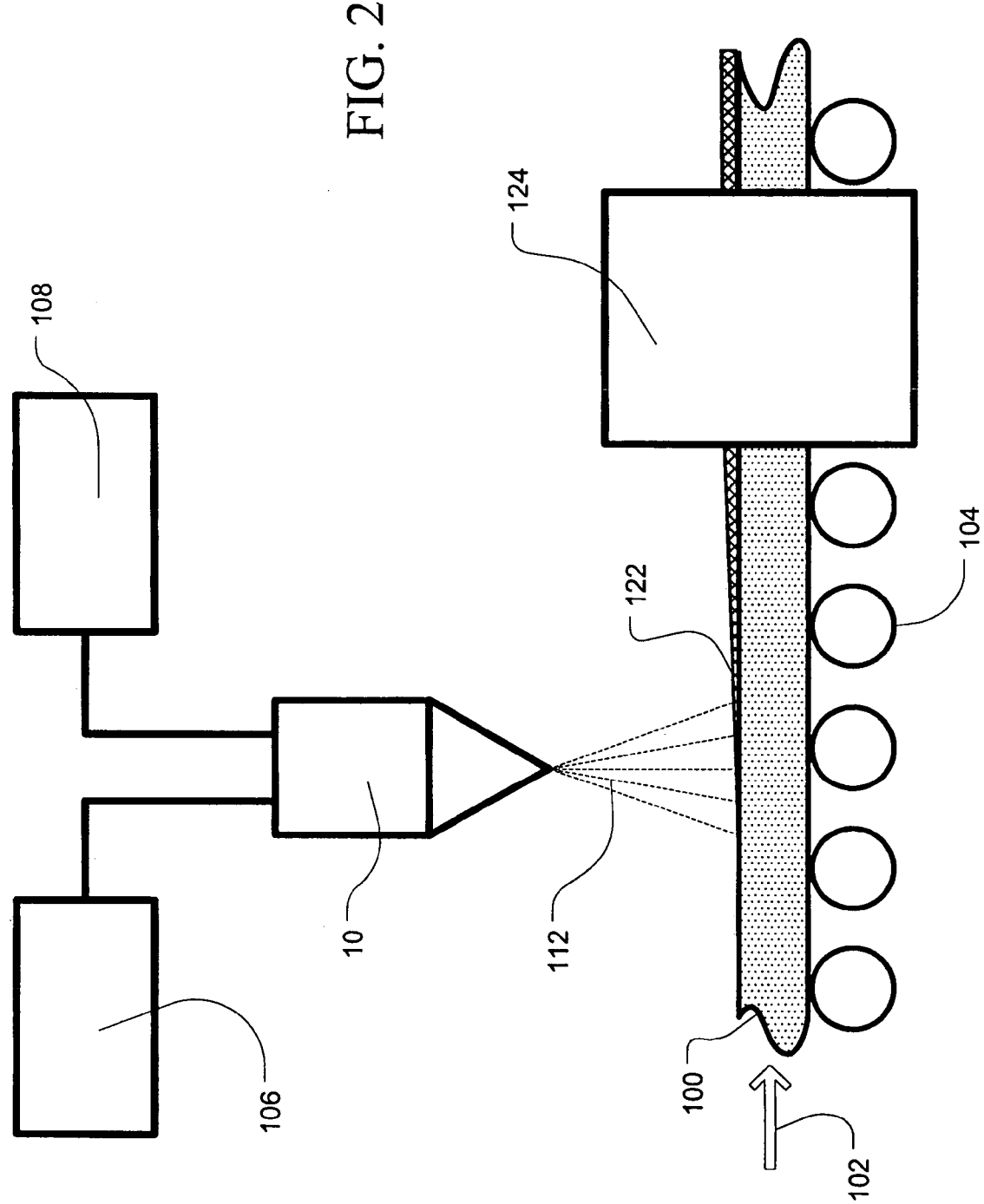
FIG. 2 illustrates an alternative assembly for applying an encapsulating foam layer to a surface of a fiber batt in which a foaming mixture is sprayed onto a surface of the batt and allowed to expand.

As illustrated in FIG. 2, an alternative foam application utilizes an applicator spray head 10 configured to spray a foaming mixture 112 directly onto the batt surface where a combination of pressure reduction, foaming agents and/or catalysts will cause the foaming mixture to expand into a foam layer of the desired consistency. The orientation and spacing of the applicator spray head(s) 10 with respect to the fiber batt 100 will affect the properties of the resulting encapsulating foam layer. Further, the foam applicator spray head(s) 10 may be generally fixed with respect to the fiber batt 100 or may provide for a range of motion including one or more of linear, rotational, orbital, radial and/or angular displacement relative to the fiber batt and each other.

Some relative motion of the foam applicator spray head(s) 10 and the fiber batt 100 may be especially helpful in ensuring that corner regions of the fiber batt 100, i.e., the junction between adjacent surfaces, are coated to a sufficient degree. Although, as illustrated in FIG. 2, it is possible to produce the foam at the batt surface, typically through the use of pressurized systems in combination with catalysts and/or blowing agents to produce a foaming mixture, such methods do not tend to produce foam having the desired levels of quality and uniformity and are, therefore, not generally preferred for most applications.

As illustrated in FIG. 3, another alternative embodiment of an apparatus for practicing the invention provides for the formation of an encapsulating foam layer 122 on a surface of a fiber batt 100 using the basic apparatus described in connection with FIG. 2, but further includes one or more blade or knife 116 downstream of the initial foam application for controlling the uniformity and thickness of the foam layer. Excess foam may tend to accumulate on the upstream side of the knife 116 and thereby reduce the likelihood of thinned regions within the foam layer. The knife 116 may be fixed or may be moveable relative to the fiber batt 100 to allow adjustment for adapting to changes in the fiber batt or foam compositions.

The knife 116 may also comprise a series of independently adjustable elements so that the thickness of the foam layer may be adjusted more gradually or otherwise modified by, for instance, removing substantially all of the foam from a relatively narrow region or forcing the foam more deeply into the fiber batt. The polymeric foam composition may also include additional materials intended to modify the properties of one or more of the surface regions of the fiber batt to improve subsequent processing performance, improve the performance of the installed product and/or alter the appearance of the resulting product.

Figure 4B:
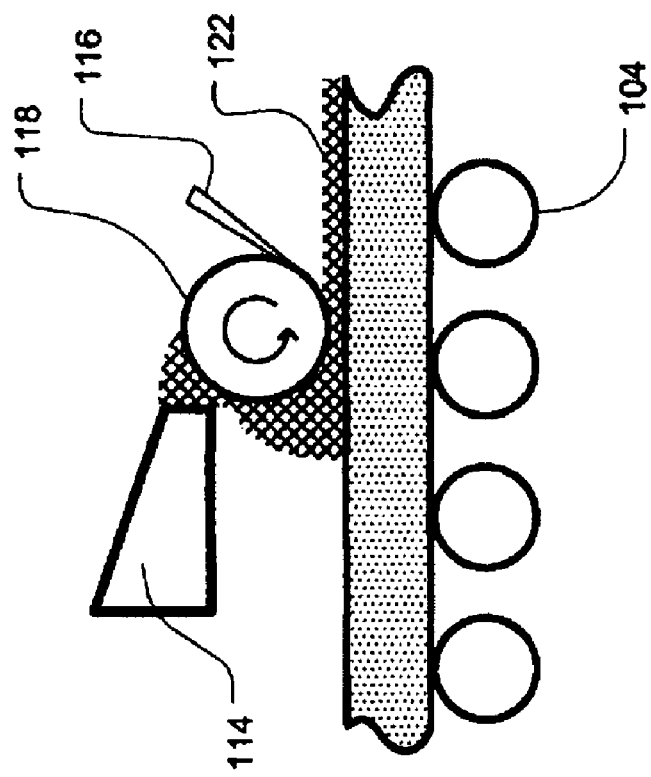
FIGS. 4A and 4B illustrate an alternative embodiment of the basic assembly for forming an encapsulating foam layer to a surface of a fiber batt in which a layer of foam is applied to the surface using one or more (not shown) rollers and/or one or more knife blades to control the foam application and/or transfer the foam from the applicator 114 to a fiber batt surface.
Figure 4A:
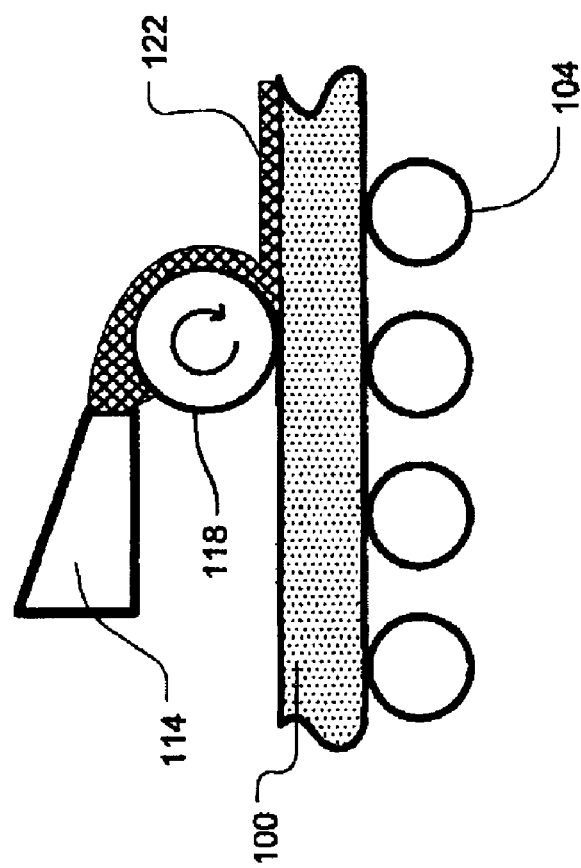

As illustrated in FIGS. 4A–B, another alternative embodiment of an apparatus for practicing the invention provides for the formation of an encapsulating foam layer 122 on a surface of a fiber batt 100 using the basic apparatus described in connection with FIG. 1, but further includes a roller 118 onto which the foam composition 122 is deposited for transfer to the fiber batt 118 for controlling the uniformity, thickness and penetration depth of the foam layer 122. Depending on the direction of rotation, excess foam may tend to accumulate on the upstream side of the roller 118 and thereby reduce the likelihood of thinned regions within the foam layer. The roller 118 may be fixed or may be moveable relative to the fiber batt 100 to allow adjustment for adapting to changes in the fiber batt or foam compositions and may be used in combination with one or more blades or knives 116 for removing foam from the roller or providing addition control over the foam thickness.

The roller 118 may also comprise a series of independently adjustable elements so that the thickness of the foam layer may be adjusted more gradually or otherwise modified by, for instance, removing substantially all of the foam from a relatively narrow region or forcing the foam more deeply into the fiber batt. The polymeric foam composition may also include additional materials intended to modify the properties of one or more of the surface regions of the fiber batt to improve subsequent processing performance, improve the performance of the installed product and/or alter the appearance of the resulting product.

Although only certain application methods have been illustrated and discussed herein, those of ordinary skill in the art will appreciate that other conventional means of foam application may be utilized in the present invention. Such foam application methods include, for example, screen printing, knife coating, roll coating, layer extrusion, print application, transfer coating and combinations thereof.

As illustrated in FIGS. 5A–D, the interaction of the foam layer 122 and the fiber batt 100 may be controlled to some extent by the composition of the polymeric foam, the method of foam application and the post-application treatment. As illustrated in FIG. 5A, in one exemplary embodiment, the foam layer 122 maintains a generally uniform thickness and generally incorporates a layer of the fibers that make up the fiber batt 100. As illustrated in FIG. 5B, in another exemplary embodiment, the foam layer 123 behaves more like a premanufactured layer and generally lays across the topmost fibers that make up the fiber batt 101, bridging the openings between the fibers. As illustrated in FIG. 5C, in another exemplary embodiment, the foam layer 125 behaves more like a liquid and tends to penetrate more deeply into the fiber batt 103 as it flows down into the gaps between the fibers. As illustrated in FIG. 5D, in another exemplary embodiment, the foam layer 127 behaves more like the foam of FIG. 5C penetrating deeply into the fiber batt 105, but also exhibits a non-uniform density in which, for instance, the outer surface forms an essentially unfoamed "skin" layer over a lower density foam bulk. As those of ordinary skill in the art will appreciate, the embodiments illustrated in FIGS. 5A–D are exemplary only and that a variety of other configurations could be achieved by altering the composition of the polymeric foam, the method of foam application and the post-application treatment.

Figure 6:
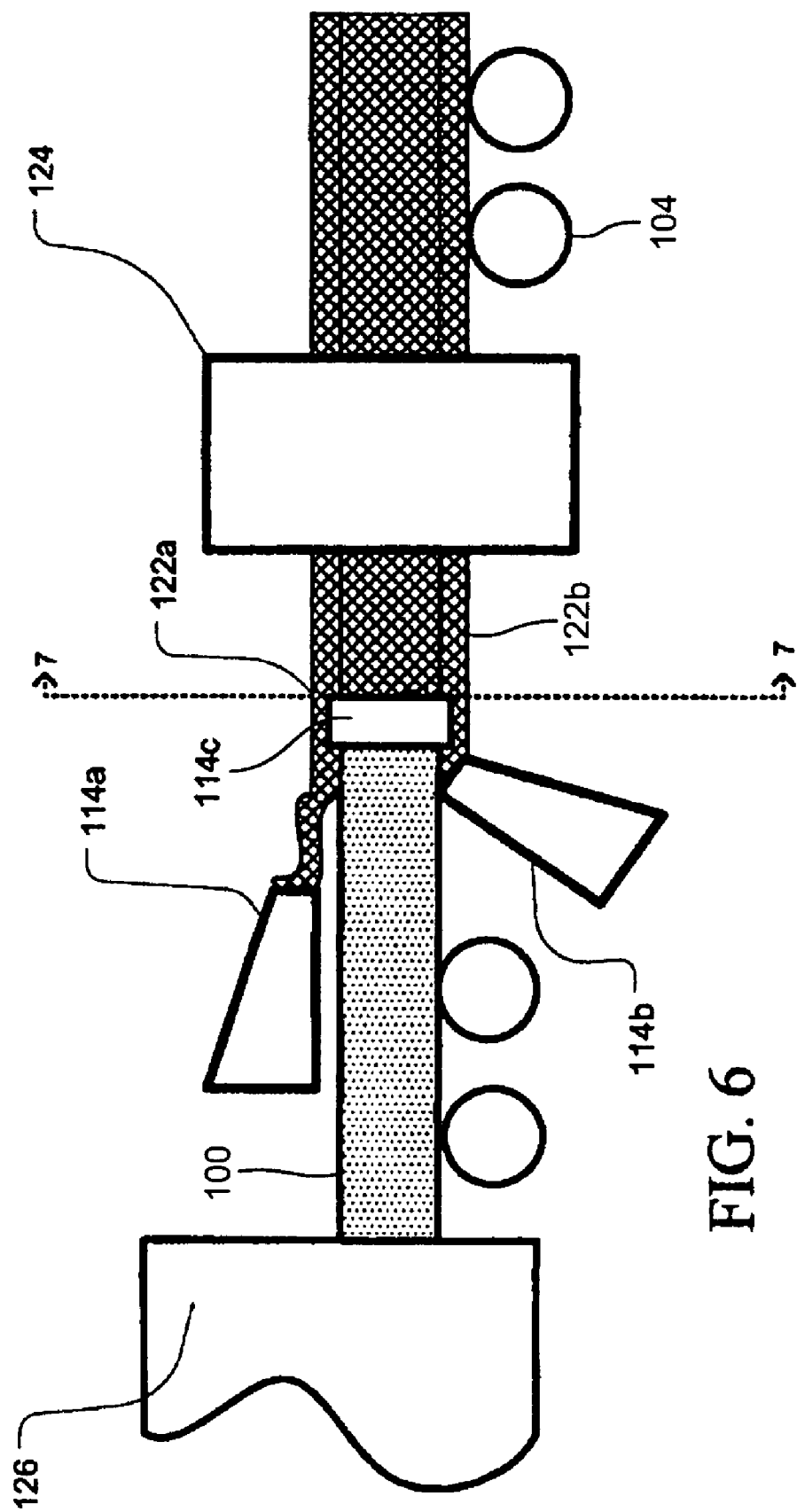
FIG. 6 illustrates an alternative embodiment of the basic assembly for fully encapsulating a continuous fiber batt with a polymeric foam layer.
Figure 7:
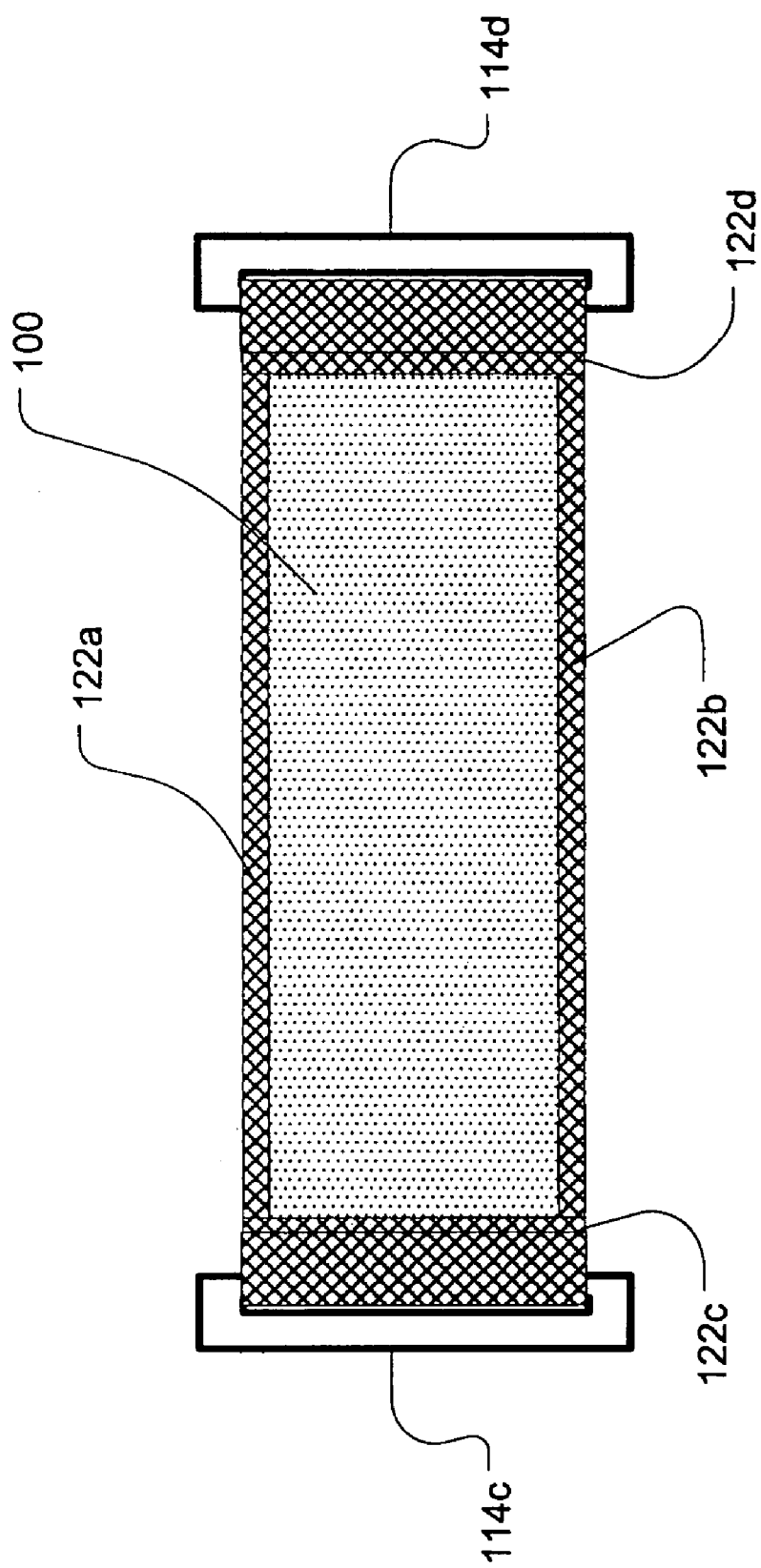
FIG. 7 illustrates a cross-section of the coated fiber batt illustrated in FIG. 6.

As illustrated in FIG. 6, a fiber batt 100, which may be exiting an upstream process apparatus 126, such as a binder curing oven, may be encapsulated by applying foam layers to the major surfaces with foam applicators 114a, 114b or other suitable application method(s). Foam layers may then be applied to the minor (side) surfaces with side foam applicators to achieve complete encapsulation of the fiber batt as illustrated in FIG. 7 (a cross-section along line 7—7 in FIG. 6 showing side foam applicators 114c, 114d). The application of foam layers 122a, 122b, 122c, 122d to the various surfaces of the fiber batt 100 may be generally simultaneous or sequential and one or more foam layers may be dried or cured before the application of subsequent layers so that at least one "dry" side is available to ease the handling of the fiber batt. Similarly, the particular technique (s) used to apply the foam layers and the composition(s) of the foam layers may be the same for all sides of the fiber batt 100 or may utilize a variety of techniques and/or foam compositions, allowing the properties of the encapsulated fiber batt to be adapted or tailored for improved manufacturability and/or improved performance in specific applications.

Figure 8:
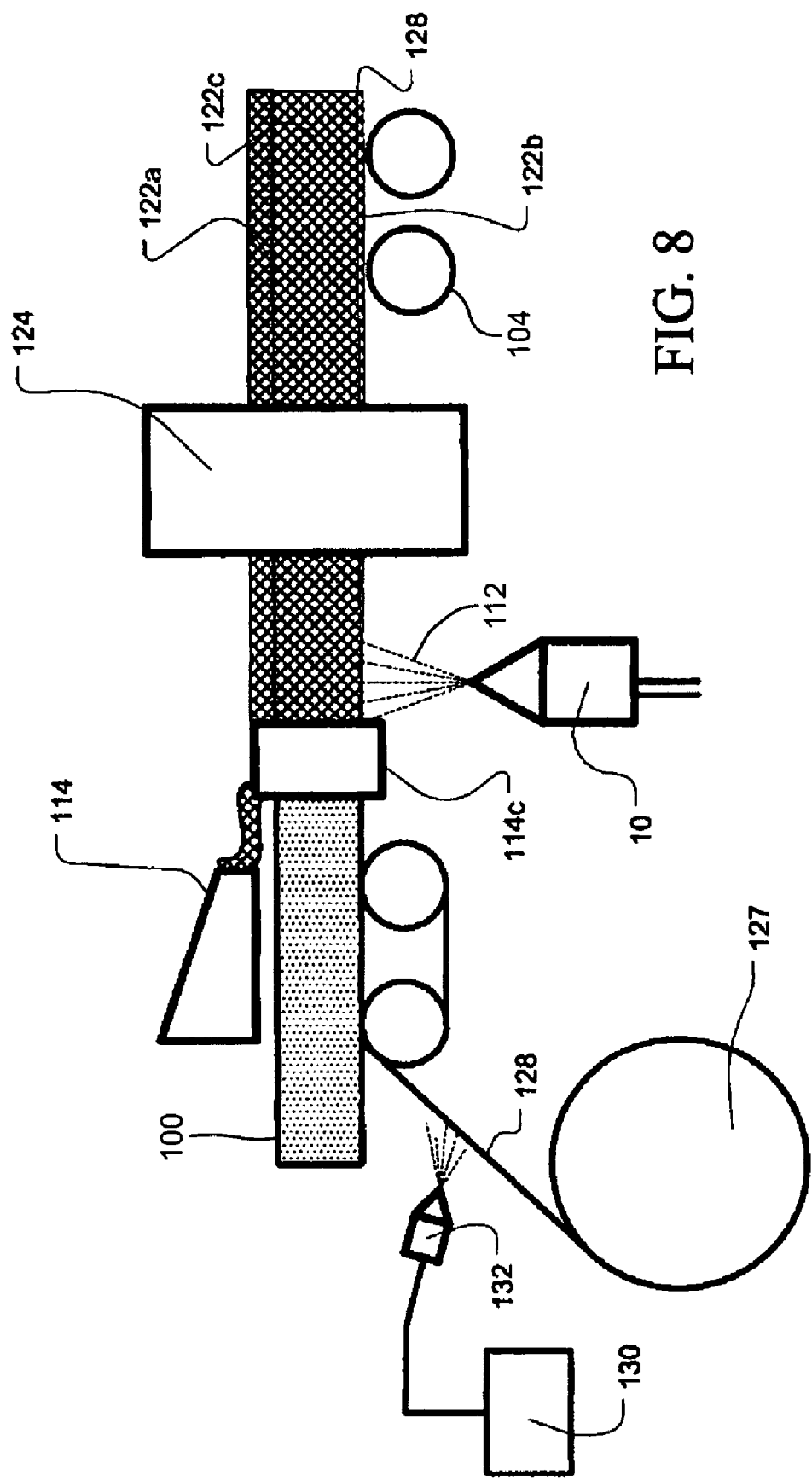
FIG. 8 illustrates an alternative embodiment of the basic assembly configured for applying a premanufactured layer to the fiber batt surface before completing the foam encapsulation.
Figure 9:
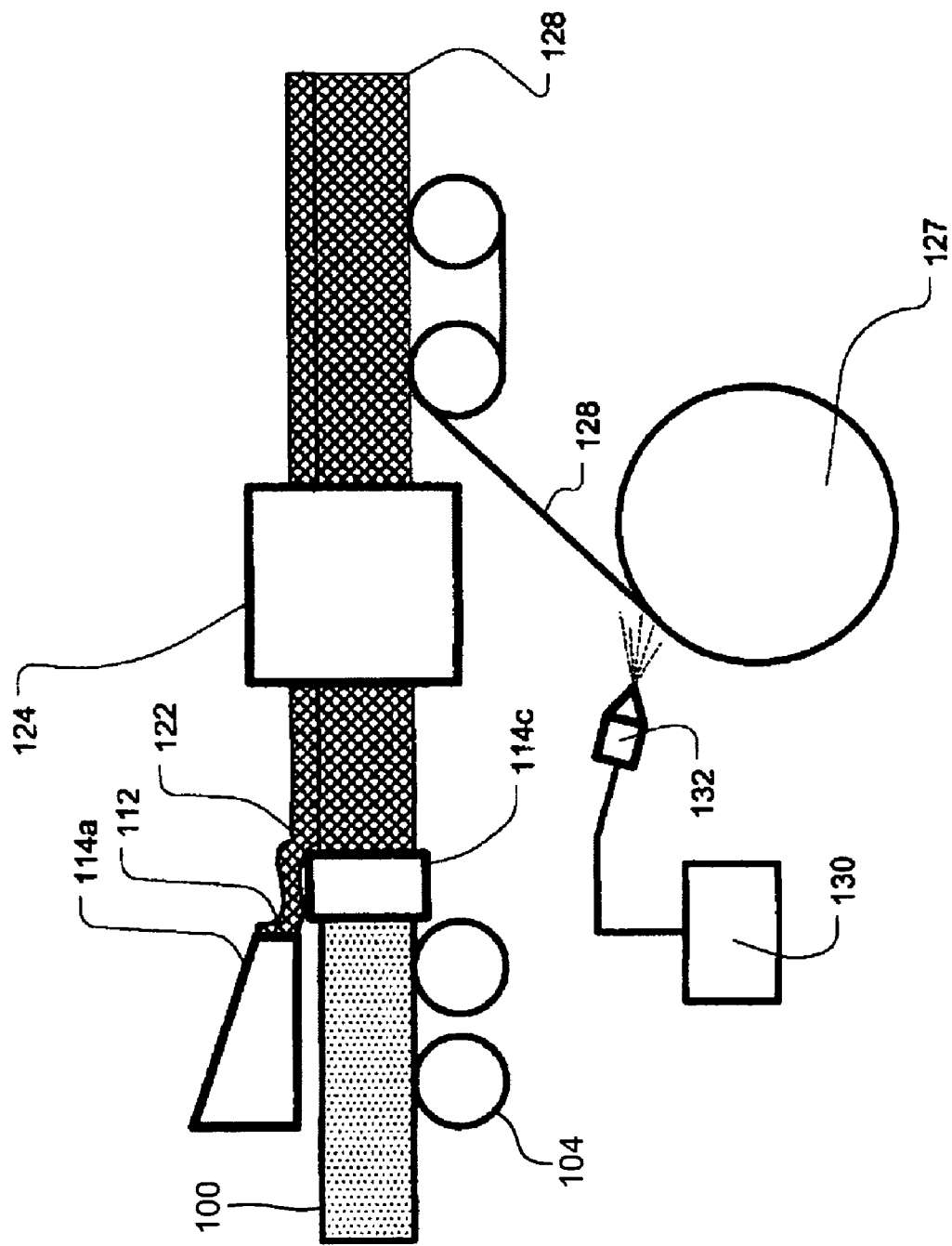
FIG. 9 illustrates an alternative embodiment of the basic assembly configured for applying a premanufactured layer to the fiber batt surface before encapsulating the remaining surfaces of the fiber batt with a polymeric foam layer.

As illustrated in FIGS. 8 and 9, another exemplary embodiment of an apparatus according to the invention may be configured to apply a vapor retarding layer, vapor permeable layer or other facing material, or a reinforcing layer on one or more surfaces of the fiber batt 100. In the illustrated embodiment, a premanufactured sheet product such as a film, layer, or woven or non-woven fabric or mesh is prepared and arranged to be dispensed from a supply means 127 such as a roll or other storage means. The premanufactured sheet material 128 is then drawn from the supply means 127 and typically coated with a layer of adhesive which may be applied by contact or spraying means. Because the premanufactured material 128 is being applied to the fiber batt 100 prior to the drying/curing oven 124, the premanufactured material should be one that has sufficient thermal stability to suffer no significant degradation as it passes through the oven. As illustrated in FIG. 8, the adhesive may be delivered to a spray assembly 132, which may be configured as a foam application assembly, that sprays adhesive, such as a hot-melt adhesive, from an adhesive supply 130 onto a surface of the premanufactured sheet product 128. The adhesive-coated surface of the vapor retarding layer is then pressed against a surface of the fiber batt 100 for a period sufficient to allow the adhesive to bond the premanufactured sheet product to the fiber batt. Further, as illustrated in FIG. 8, depending on the nature of the sheet material 128, a foam layer 122b may be formed over the sheet material as well as the other fiber batt surfaces.

As illustrated in FIG. 9, however, in another embodiment the sheet material 128 is not coated with foam and may, therefore, be applied after the foam layers on the remaining surfaces of the fiber batt 100 have been dried and/or cured by passing through drying/curing oven 124. By applying the premanufactured sheet material 128 in this manner, a wider range of materials may be utilized, including those with relatively low melting or softening temperatures. If the fiber batt 100 is to be cut into smaller batts, the application of the sheet material may be deferred until after the cutting process has been completed, thereby allowing the application of excess sheet material to provide for flanges or a partial or complete overwrap of adjacent surfaces.

The premanufactured sheet product 128, may be selected from a wide variety of other layers, films, fabrics or substrates suitable for modifying one or more surfaces of the fiber batt 100 before the remaining surfaces are encapsulated. The premanufactured sheet products may be selected from vapor retarding layers, decorative materials, conventional asphalt-coated kraft paper, kraft paper, spun-bonded films, layers or fabrics, meshes, pre-perforated or other permeable films.

Depending on the particular material(s) being applied to the fiber batt, they may be self-adhesive or, if a separate adhesive is required, it may be applied by a variety of known methods including spraying, rolling and/or dripping suitable for applying an adequate amount and pattern of adhesive to the premanufactured sheet product, thereby ensuring both a satisfactory bond to the underlying fiber batt and a modification of the properties of the original fiber batt. The properties modified may include, for example, strength, permeability to vapor and/or liquid, appearance, color and/or text such as trademarks, product designations or decorative patterns or images, particularly for exposed applications, feel, touch or handling safety.

Figure 10B:
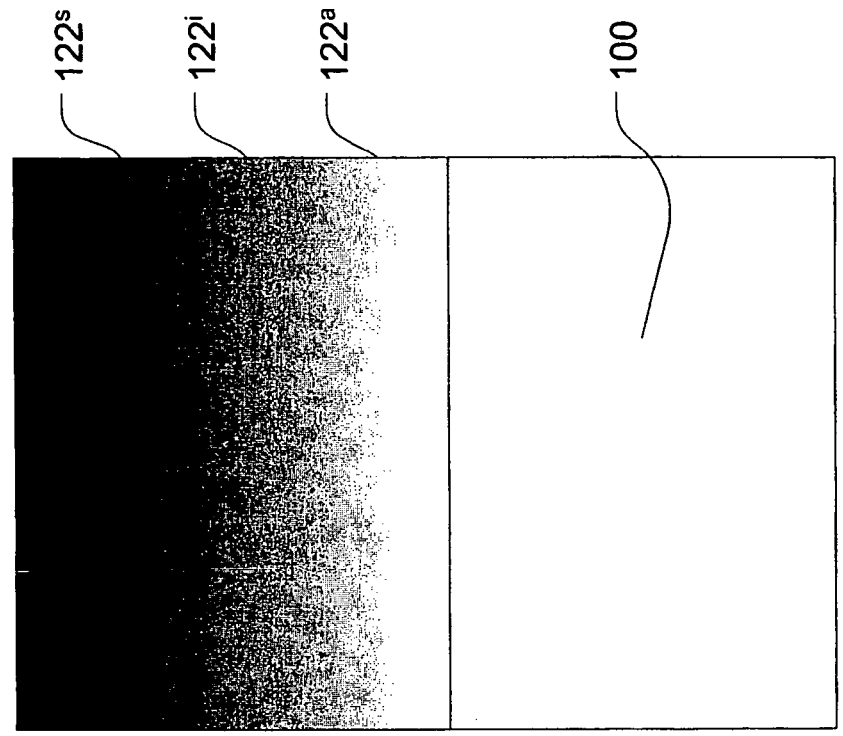
FIGS. 10A and 10B illustrate exemplary embodiments of the structure of the foam encapsulating layer.
Figure 10A:
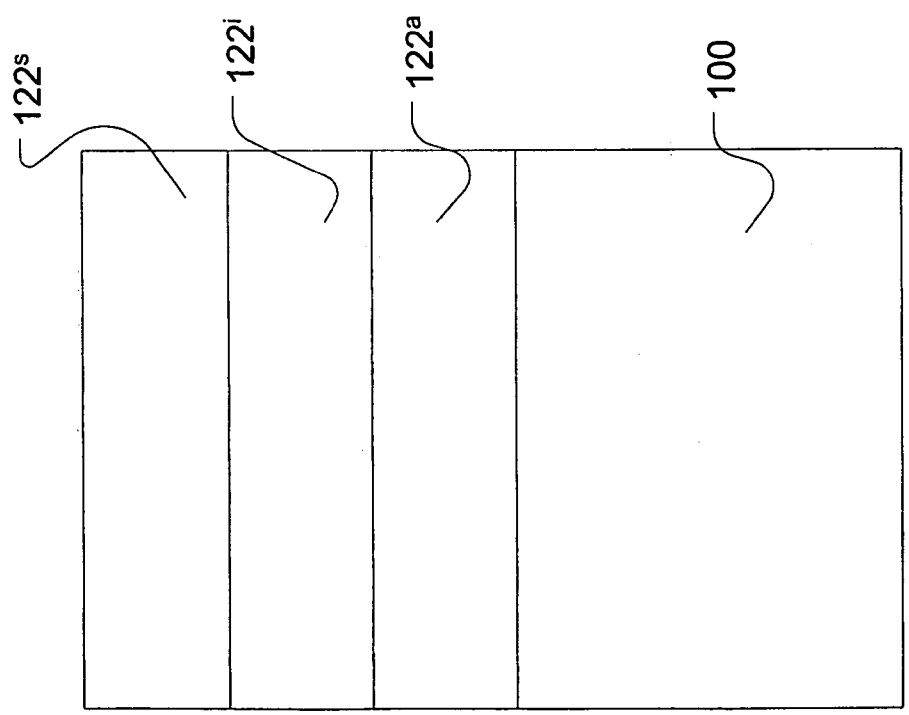

As illustrated in FIGS. 10A–B, the polymeric foam layer may comprise layers having different properties by controlling the composition, application and post-application treatment of the foam layer 122 to the fiber batt 100. As illustrated in FIG. 10A, the foam layer may be formed with sublayers that have enhanced strength, $122^s$, intermediate strength and adhesive properties, $122^i$, or enhanced density properties, $122^a$, relative to the other foam compositions included in the layer. Although as illustrated in FIG. 10A the foam layer construction may include distinct sublayers when multiple foam applications are utilized, when the variation in properties are achieved through the post-application processing, e.g., curing, it is believed that the properties of the foam layer 122 may exhibit a more gradual and continuous transition in one or more properties as illustrated in FIG. 10B. As noted above, these drawings are not to scale and, in this instance, the thickness of the foam layer has been exaggerated relative to the fiber batt to illustrate more clearly the foam layer microstructure.

Figure 11A:
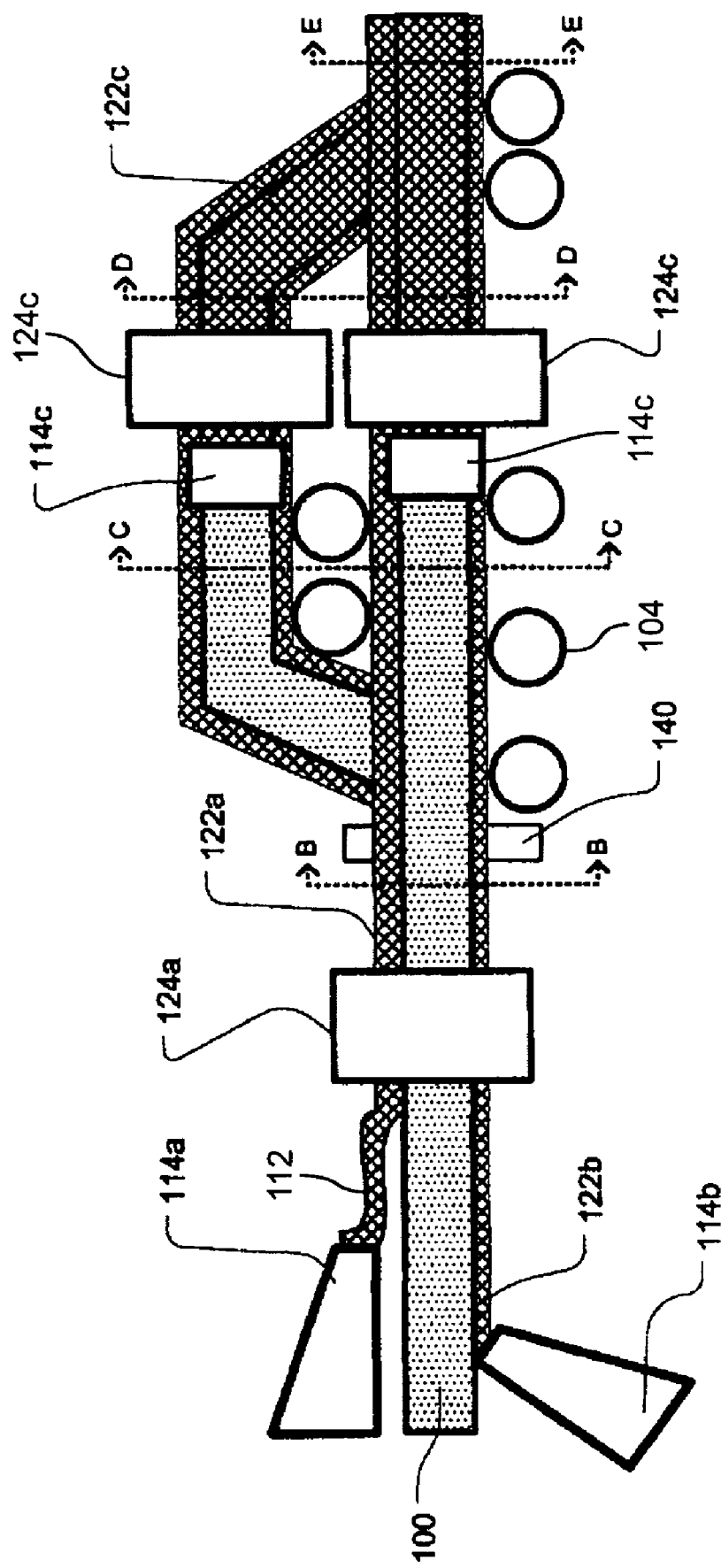
FIG. 11A–11E illustrate an alternative embodiment of the basic assembly configured for encapsulating a plurality of fiber batts with a polymeric foam including FIGS. 11B–11E which show cross-sectional views of the fiber batt(s) as the encapsulation process illustrated in FIG. 11A proceeds.

As illustrated in FIG. 11A, foam applicators or foam applicator assemblies may be arranged adjacent both of the minor surfaces for forming encapsulating foam layers 122c, 122d on the minor surfaces of the fiber batt 100. These foam applicators 114c, 114d (not shown) may be configured in a manner similar to that of the foam applicators 114a, 114b used for applying the encapsulating foam layers 122a, 122b to the major surfaces of the batt. Similarly, the side foam applicators may be arranged in close proximity to additional drying/curing ovens 124c, 124d (not shown) for setting the applied foam layers shortly after application. Although illustrated for convenience as being applied by foam applicators, as appreciated by those of ordinary skill in the art, the foam layers may be applied to each of the surfaces of the fiber batt 100 by any conventional method suitable for the orientation of the surface being coated and capable of applying a foam layer of the desired thickness, consistency and uniformity.

Figure 11B:
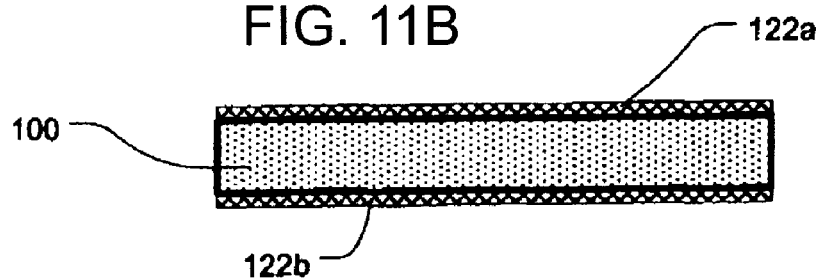
Figure 11C:
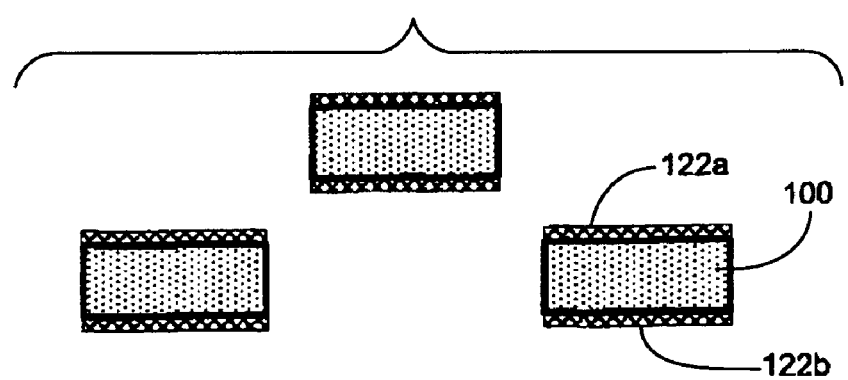

As illustrated in FIG. 11A, the exemplary embodiments described above for forming a polymeric foam layer for encapsulating one or more surfaces of a fiber batt as described above may be adapted to accommodate the coating of multiple fiber batts that utilize one of a variety of conveyor assemblies. As illustrated in FIGS. 11A–B, the major surfaces of the primary fiber batt may be coated while the primary fiber batt remains intact. The primary fiber batt may then be separated into a plurality of fiber batts by a series of blades or other cutting tools 140. As illustrated in FIGS. 11A and 11C, after the primary fiber batt has been separated into a plurality of fiber batts, the adjacent fiber batts may be carried on separate conveyors that are arranged to provide vertical separation between adjacent fiber batts.

Figure 11D:
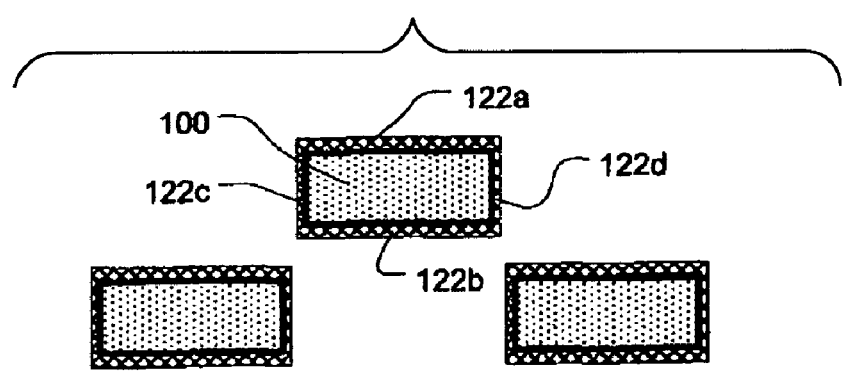
Figure 11E:
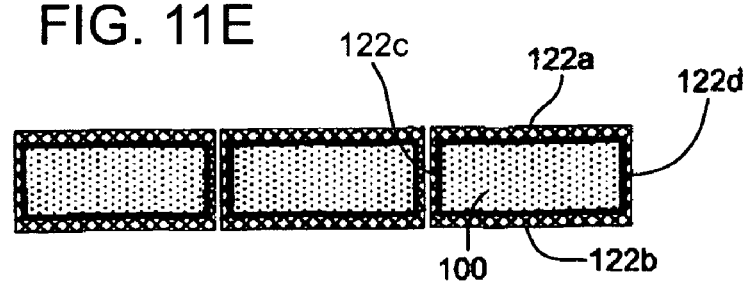

While the adjacent fiber batts are separated, the minor surfaces of the fiber batts may be coated to complete the encapsulation of the fiber batts as shown in FIG. 11D. After the fiber batts have been coated and the encapsulating foam layers are sufficiently dried or set, the individual batts may once again be conveyed in a generally planar relationship as illustrated in FIG. 11E and be fed to additional processing steps such as chopping, rolling and/or bagging (not shown). It will also be appreciated that although the exemplary embodiments illustrated in FIGS. 11–15 include only three secondary fiber batts, the basic principles and apparatus are not so limited and may be applied to manufacture any practical number of fiber batts.

A variety of techniques may used, either singly or in combination, to separate the secondary fiber batts for individual processing. The specific technique(s) utilized may depend on a variety of factors including, for example, the number of secondary batts, the speed at which the batts are advanced through the apparatus, the type of processing to be completed while the secondary fiber batts are separated and the physical space in which the encapsulating apparatus must be placed. In each instance, however, the goal of the separation techniques is to reduce or eliminate interference between the adjacent fiber batts and the processing equipment necessary to process one or more of the unencapsulated surfaces of the fiber batts.

Figure 12A:
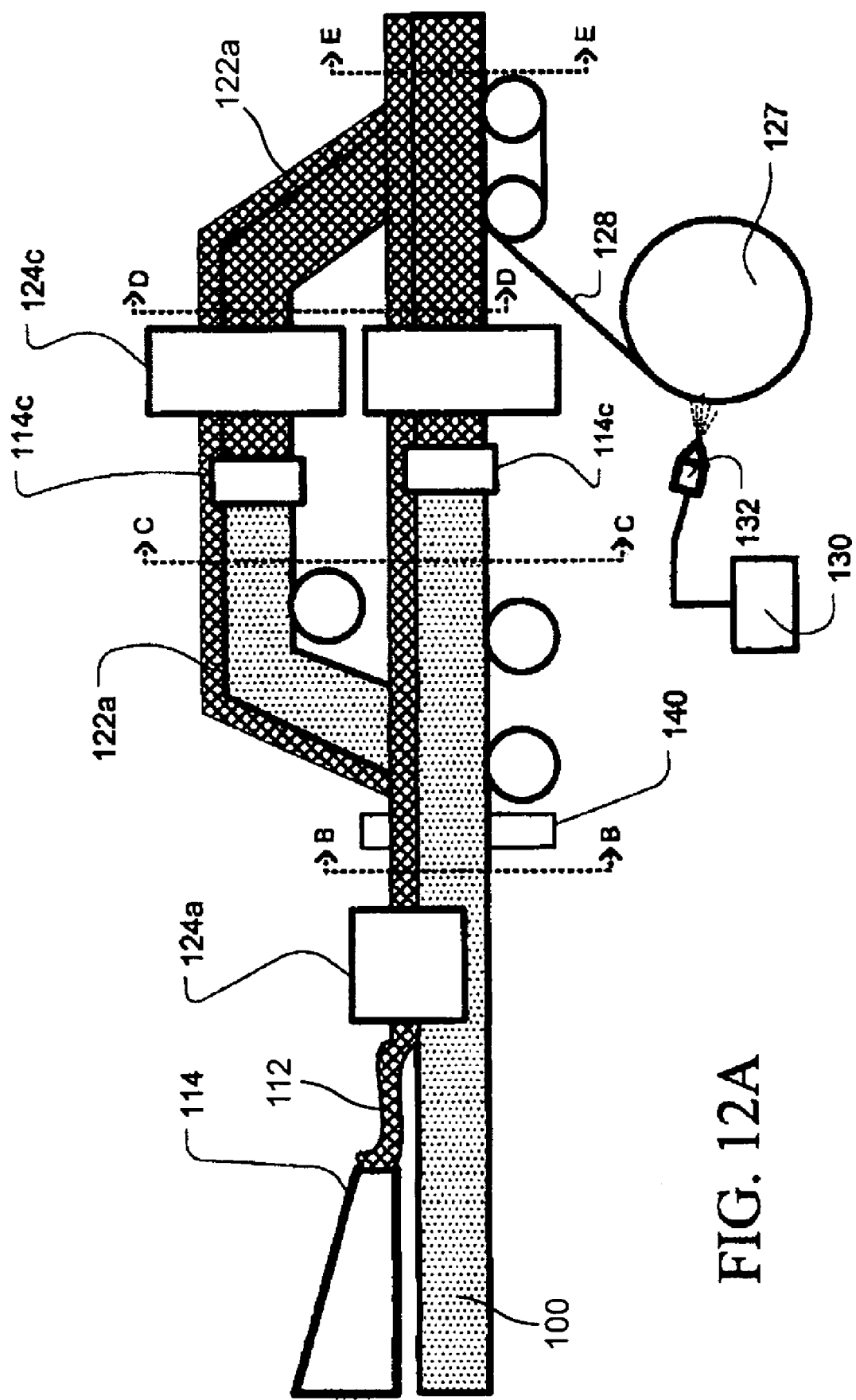
FIG. 12A–12E illustrates an alternative embodiment of the basic assembly configured for encapsulating a plurality of fiber batts with combination of a premanufactured layer and polymeric foam including FIGS. 12B–12E which show cross-sectional views of the fiber batt(s) as the encapsulation process illustrated in FIG. 12A proceeds.
Figure 12B:
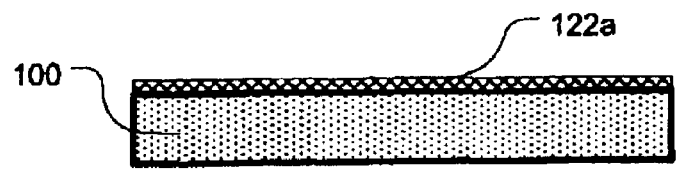
Figure 12C:
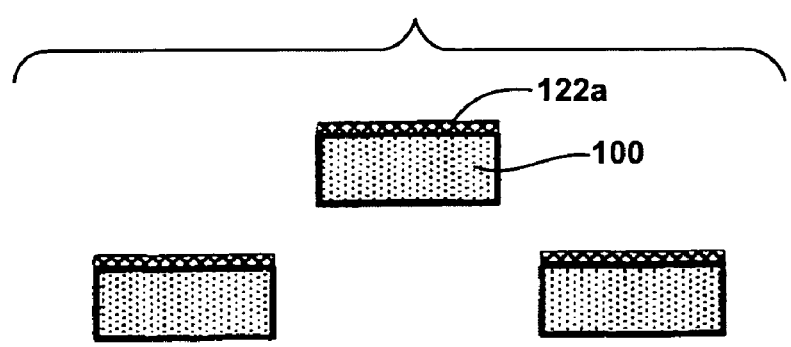

As illustrated in FIG. 12A, a second exemplary embodiment of an apparatus for forming a polymeric foam coating described above may be adapted to accommodate the coating of multiple fiber batts that utilize one of a variety of conveyor assemblies. As illustrated in FIGS. 12A–B, one of the major surfaces of the primary fiber batt may be coated with one or more polymeric foams. The primary fiber batt may then be separated into a plurality of fiber batts by a series of blades or other cutting tools 140. It will be appreciated that for applications in which excess sheet material is desired for forming, for example, attachment flanges or partial attachment to adjacent surfaces, the sheet product(s) 128 may be individually applied to the secondary batts after the various foam layers have been dried and/or cured. As illustrated in FIGS. 12A and 12C, after the primary fiber batt has been separated into a plurality of fiber batts, the adjacent fiber batts may be carried on separate conveyors that are arranged to provide vertical separation between adjacent fiber batts.

Figure 12D:
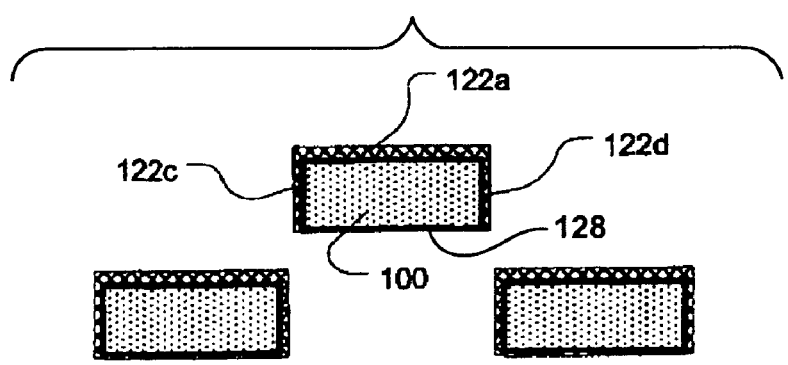
Figure 12E:
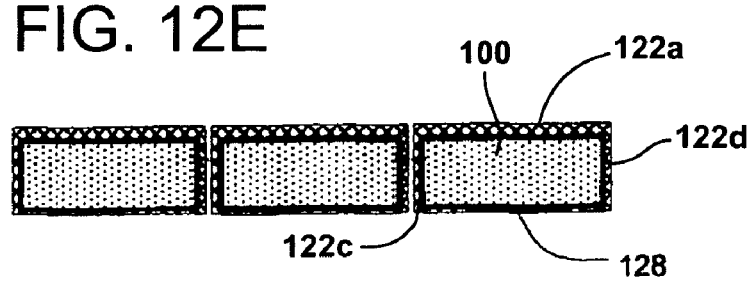

While the adjacent fiber batts are separated, the minor surfaces of the fiber batts may be coated with a polymeric foam layer to complete the encapsulation of the fiber batts as shown in FIG. 12D. After the fiber batts have been coated and the encapsulating foam layers are sufficiently set, the sheet material(s) 128 may be applied to the individual batts and the batts may once again be conveyed in a generally planar relationship as illustrated in FIG. 12E and be fed to additional processing steps such as chopping, rolling and/or bagging (not shown).

Figure 13A:
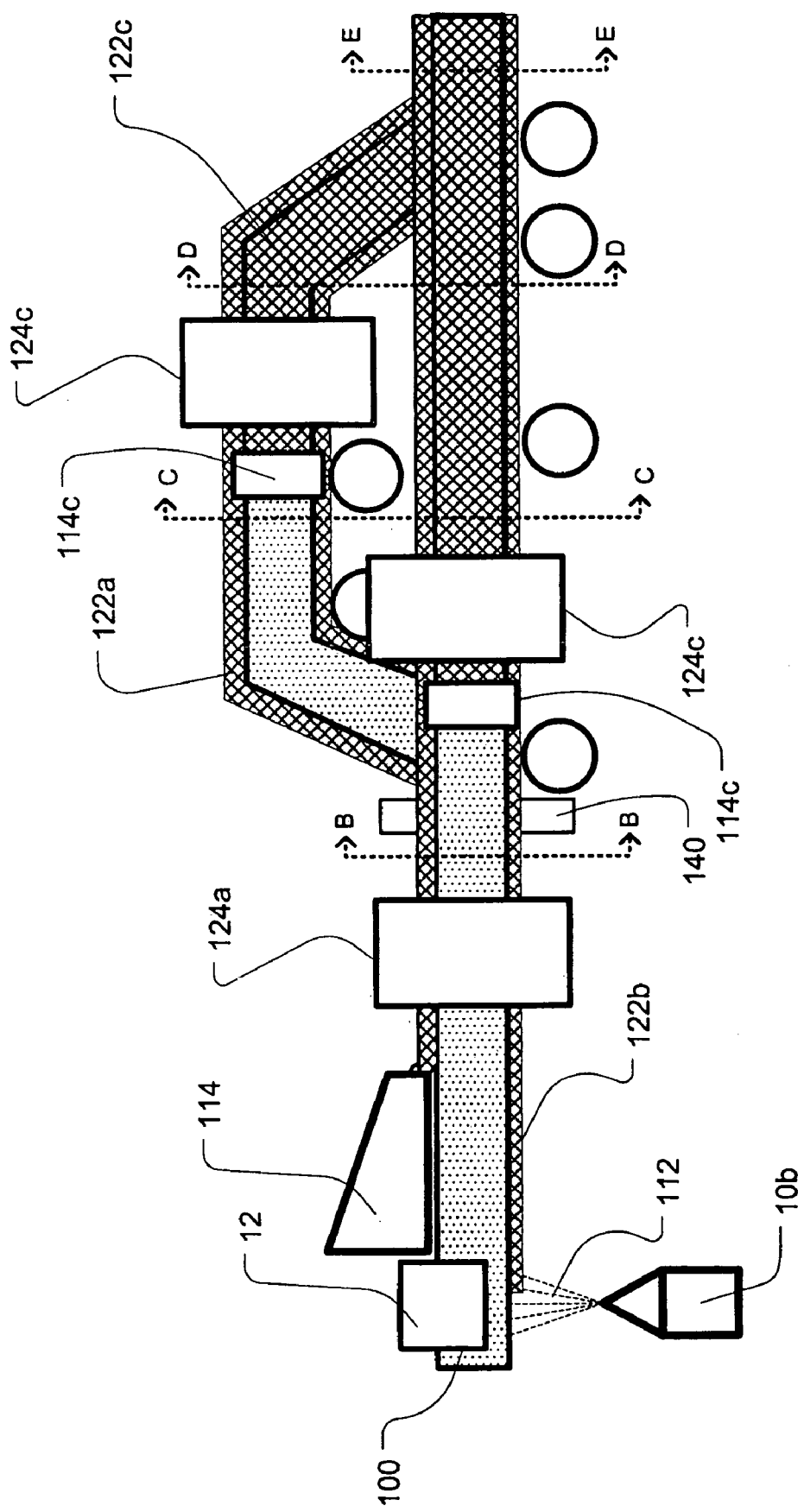
FIG. 13A–13E illustrates an alternative embodiment of the basic assembly configured for encapsulating a plurality of fiber batts with a polymeric foam including FIGS. 13B–13E which show cross-sectional views of the fiber batt(s) as the encapsulation process illustrated in FIG. 13A proceeds.
Figure 13B:
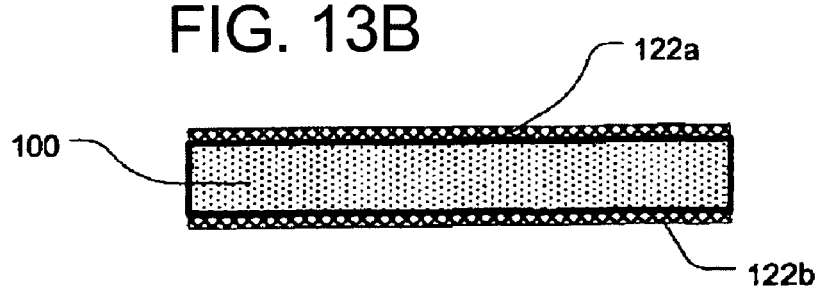
Figure 13C:
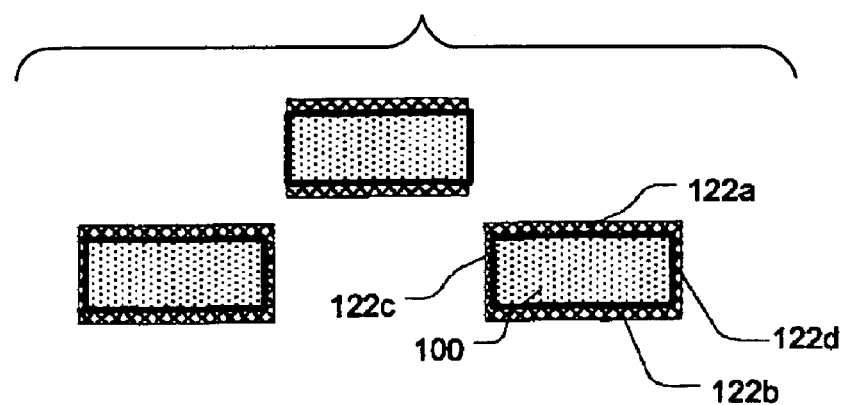

As illustrated in FIG. 13A, a third exemplary embodiment of an apparatus for forming a polymeric foam coating described above may be adapted to accommodate the coating of multiple fiber batts that utilize one of a variety of conveyor assemblies. As illustrated in FIGS. 13A–B, the major surfaces of the primary fiber batt may be coated while the primary fiber batt remains intact. As illustrated in FIG. 13A, if spray coating is used to apply a foaming mixture 122b through spray head 10b to coat a lower surface, a supplement vacuum unit 12 may be utilized to promote adhesion of the foaming material and reduce overspray issues. The primary fiber batt may then be separated into a plurality of fiber batts by a series of blades or other cutting tools 140. As illustrated in FIGS. 13A and 13C, after the primary fiber batt has been separated into a plurality of fiber batts, the adjacent fiber batts may be carried on separate conveyors that are arranged to provide vertical separation between adjacent fiber batts.

Figure 13D:
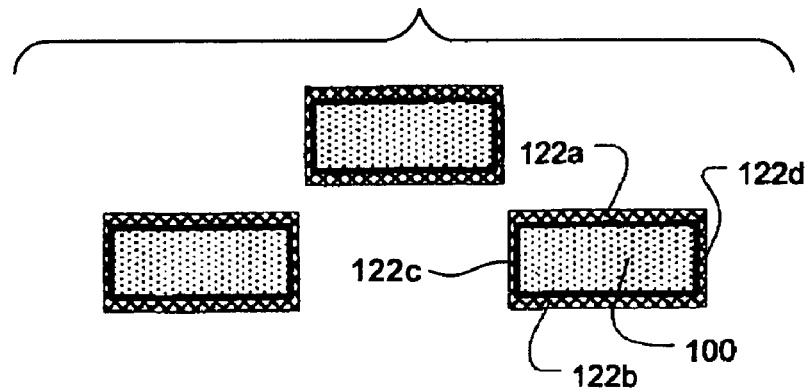
Figure 13E:
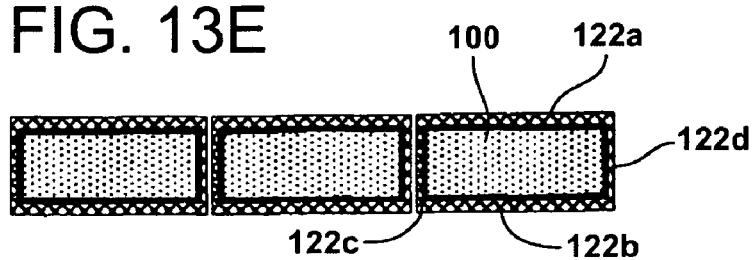

While the adjacent fiber batts are separated, a first one of the minor surfaces of the fiber batts may be coated with a polymeric foam as shown in FIG. 13C. The other minor surface of the fiber batts may then subsequently be coated to complete the encapsulation of the fiber batts as illustrated in FIG. 13D. After the fiber batts have been completely coated and the encapsulating foam layers are sufficiently set, the individual batts may once again be conveyed in a generally planar relationship as illustrated in FIG. 13E and be fed to additional processing steps such as chopping, rolling and/or bagging (not shown). Although the illustrated embodiment illustrates separation achieved by "raising" one of the fiber batts relative to the other secondary batts and the initial level of the primary fiber batt, it will be appreciated that the necessary separation may also be achieved by lowering certain of the fiber batts or by a combination of both raising and lowering adjacent batts.

Figure 14A:
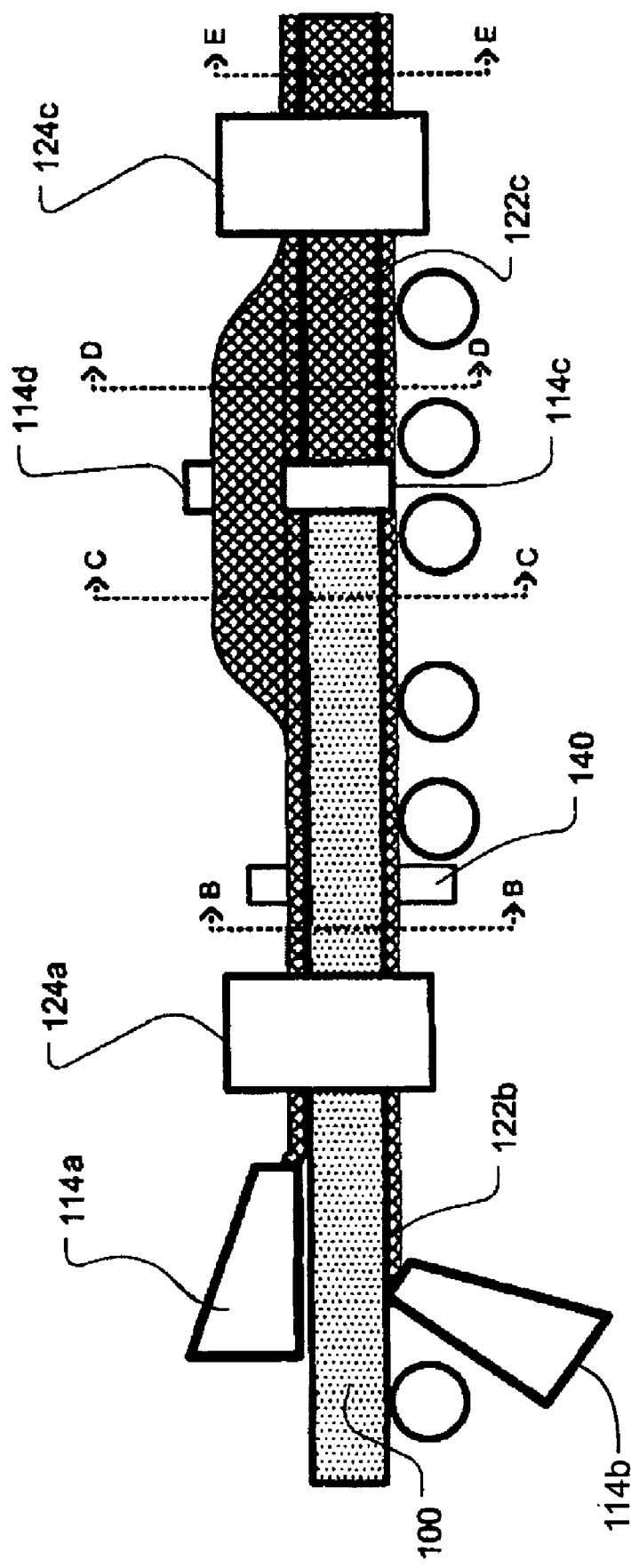
FIG. 14A illustrates an alternative embodiment of the basic assembly configured for encapsulating a plurality of fiber batts with a polymeric foam including FIGS. 14B–14E which show cross-sectional views of the fiber batt(s) as the encapsulation process illustrated in FIG. 14A proceeds.
Figure 14B:
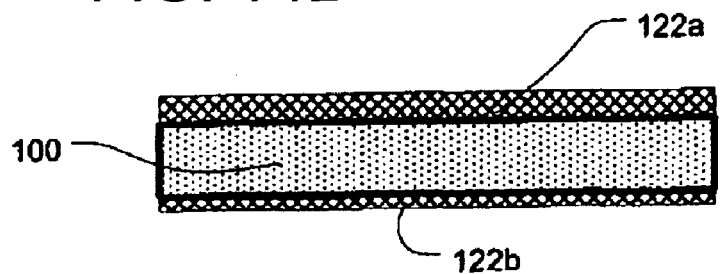
FIGS. 14F–I illustrate additional exemplary variations of the fiber batt orientation during the encapsulation process illustrated in FIGS. 14A–E.
Figure 14C:
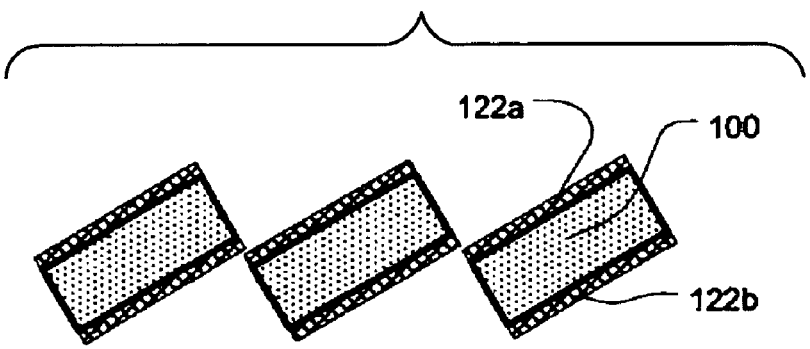

As illustrated in FIG. 14A, a fourth exemplary embodiment of an apparatus for forming a polymeric foam coating described above may be adapted to accommodate the coating of multiple fiber batts that utilize one of a variety of conveyor assemblies. As illustrated in FIGS. 14A–B, the major surfaces of the primary fiber batt may be coated while the primary fiber batt remains intact. The primary fiber batt may then be separated into a plurality of fiber batts by a series of blades or other cutting tools 140. As illustrated in FIGS. 14A–C, after the primary fiber batt has been separated into a plurality of fiber batts, the adjacent fiber batts may be carried on separate conveyors that are arranged to rotate the fiber batts to a degree sufficient to expose the minor surfaces of adjacent fiber batts.

Figure 14D:
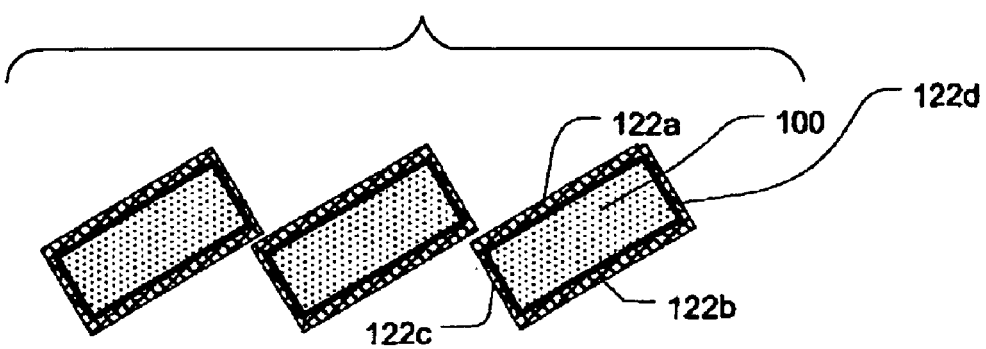
Figure 14E:
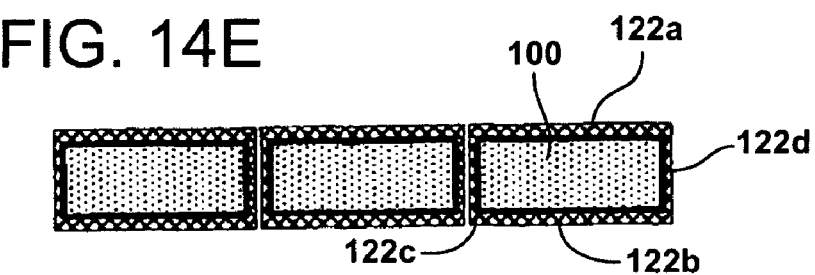

Although the illustrated embodiment illustrates only a rotational movement of the fiber batts, it will be appreciated that the necessary separation may also be achieved through a combination of rotation and vertical separation as utilized in the exemplary embodiments previously described. While the minor surfaces of the adjacent fiber batts are exposed, the minor surfaces of the fiber batts may be coated with a polymeric foam layer to complete the encapsulation of those fiber batts as illustrated in FIG. 14D. After the fiber batts have been completely coated and the encapsulating foam layers are sufficiently set, the individual batts may once again be conveyed in a generally planar relationship as illustrated in FIG. 14E and be fed to additional processing steps such as chopping, rolling and/or bagging (not shown).

As illustrated in FIGS. 14F–G, a fifth exemplary embodiment of an apparatus for forming a polymeric foam coating described above may be adapted to accommodate the coating of multiple fiber batts that utilize one of a variety of conveyor assemblies. Although generally corresponding to the fourth embodiment illustrated in FIGS. 14A–E, in this embodiment the minor surfaces of the adjacent batts are coated sequentially rather than generally simultaneously. Further, as illustrated in FIGS. 14H–I, a sixth exemplary embodiment of an apparatus for forming a polymeric foam coating described above may be adapted to accommodate the coating of multiple fiber batts that utilize one of a variety of conveyor assemblies. Although generally corresponding to the fifth embodiment illustrated in FIGS. 14F–G, in this embodiment the minor surfaces of the adjacent batts are coated sequentially rather than generally simultaneously and, in addition, the direction of the rotation of the fiber batts is reversed before the second of the minor surfaces is coated to complete the encapsulation of the fiber batts. Although, as illustrated, the more upwardly facing minor surface of the fiber batt is being coated, it will be appreciated that the coating sequence may be reversed if desired or to provide other processing advantages.

Figure 15A:
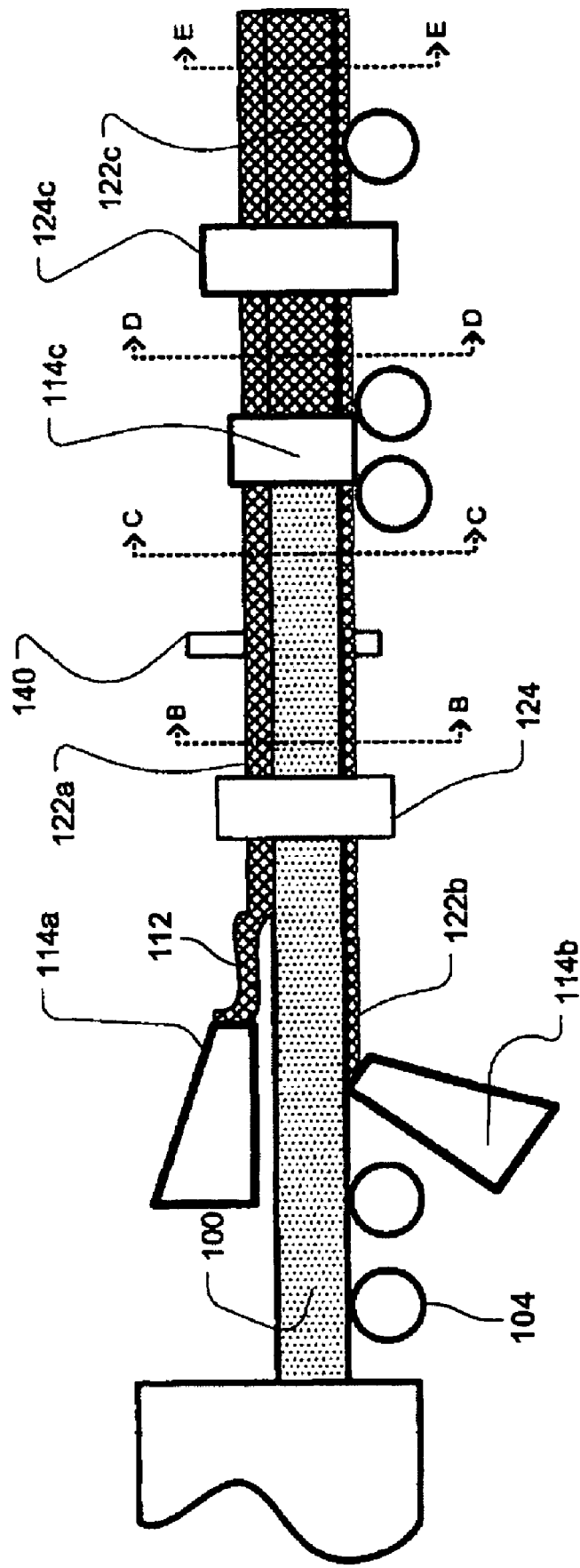
FIG. 15A illustrates an alternative embodiment of the basic assembly configured for encapsulating a plurality of fiber batts with a polymeric foam including FIGS. 15B–15E which show cross-sectional views of the fiber batt(s) as the encapsulation process illustrated in FIG. 15A proceeds.
Figure 15B:
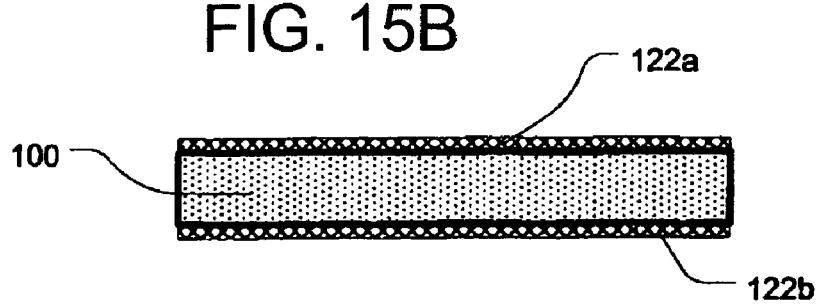
Figure 15C:
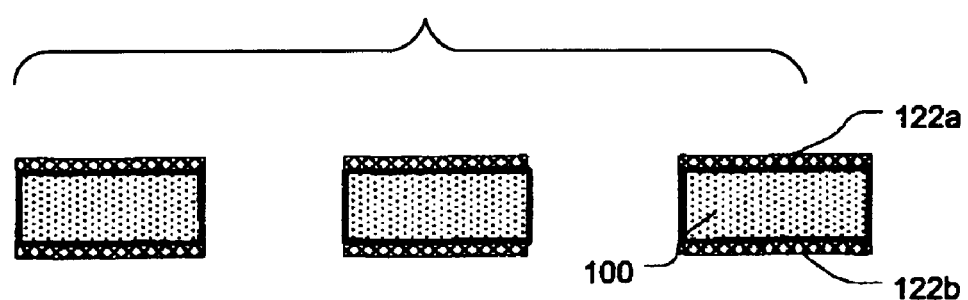

As illustrated in FIG. 15A, a seventh exemplary embodiment of an apparatus for forming a polymeric foam coating described above may be adapted to accommodate the coating of multiple fiber batts that utilize one of a variety of conveyor assemblies. As illustrated in FIGS. 15A and 15B, the major surfaces of the primary fiber batt may be coated while the primary fiber batt remains intact. The primary fiber batt may then be separated into a plurality of fiber batts by a series of blades or other cutting tools 140. As illustrated in FIGS. 15A and 15C, after the primary fiber batt has been separated into a plurality of fiber batts, the adjacent fiber batts may be carried on separate conveyors that are arranged to increase the horizontal separation between adjacent fiber batts.

Figure 15D:
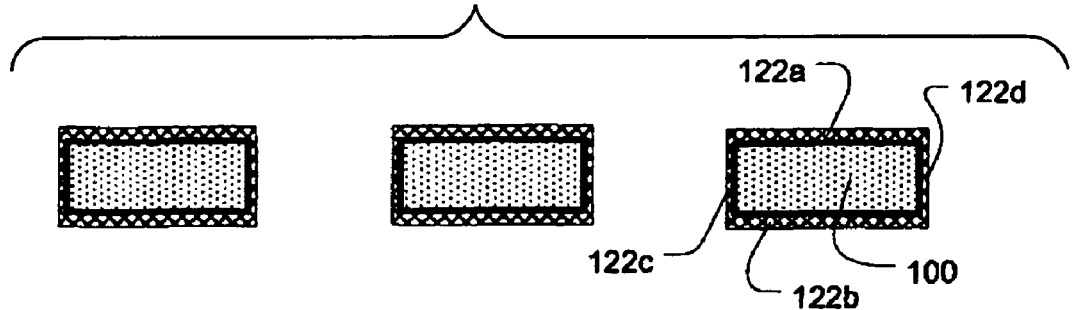
Figure 15E:
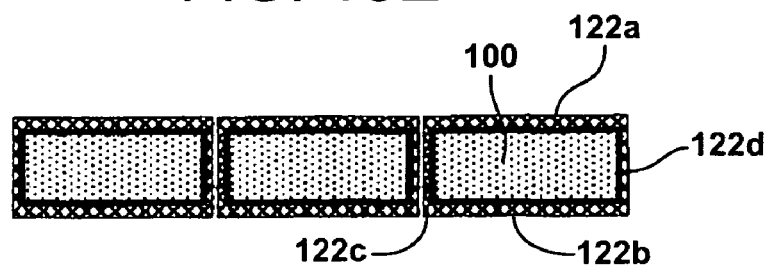

While the adjacent fiber batts are separated, the minor surfaces of the fiber batts may be coated to complete the encapsulation of the fiber batts as shown in FIG. 15D. After the fiber batts have been coated and the encapsulating foam layers are sufficiently set, the individual batts may once again be conveyed in a more closely spaced and generally planar relationship as illustrated in FIG. 15E and be fed to additional processing steps such as chopping, rolling and/or bagging (not shown). It will also be appreciated that although the exemplary embodiments illustrated in FIGS. 11–15 include only three secondary fiber batts, the basic principles and apparatus are not so limited and may be applied to manufacture any practical number of fiber batts.

EXAMPLE

Exemplary samples of foam coated fiber batts were prepared with the compositions reflected below in TABLE 1. Each of the polymeric foam coating compositions was prepared by placing the indicated ingredients in a Hobart mixer and agitating the mixture to obtain a foam exhibiting the desired foam blow ratio, i.e., final volume/initial volume. The prepared foam samples were then applied to the major and minor surfaces of one end of a series of standard R-19 fiber glass insulation batts (each measuring about 2.44 m×38.1 cm×16.5 cm (8 ft×15×6.5 inches)). Each of the foam compositions was spread on a fiber batt using a metal knife to obtain a generally uniform foam layer on one end of the batt. The partially coated batts were then dried/cured in an oven for approximately 2 minutes at about 177° C. (350° F.). After being dried and/or cured, the sample batts were cut to separate the coated (exemplary) and uncoated (control) portions of the batt for testing. The coated and uncoated portions of each batt were then weighed to determine the average surface density of the applied foam layer. The foam-coated surfaces were then qualitatively evaluated by visual and manual inspection.

TABLE 1

| Sample Number | Formulation | Blow Ratio | Surface density (g/m$^2$) | Comments |
|---|---|---|---|---|
| 1 | SB 706 Foaming agent[1] | 8:1 | 26.9 | uniform, well covered, strong |
| 2 | SB 706 Foaming agent[1] | 15:1 | 14.0 | uniform, well covered, slightly weak |
| 3 | SB 706 Foaming agent[1] | 15:1 | 6.5 | well covered, weak |
| 4 | SB 706 Clay Filler Foaming agent[1] | 9:1 | 36.6 | well covered, very weak |
| 5 | SB 1168 Foaming agent[1] | 17:1 | 20.5 | uniform, well covered, slightly soft, sensitive to moisture after aging |
| 6 | PVA 15% (100 g) LD-150 (2 g) | 13:1 | 29.1 | uniform, surface rough, durable, soft |
| 7 | PVA 15% (100 g) LD-150 (2 g) | 12:1 | 17.2 | uniform, surface rough, durable, soft |
| 8 | PVA 15% (95 g) LD-150 (2 g) Emerest 2648 (5 g) | 4.6:1 | 72.3 | poor uniformity, too thick, very rough |
| 9 | PVA 15% (95 g) LD-150 (2 g) DC 346 (8 g) | 12.6:1 | 18.1 | uniform, soft surface, durable |
| 10 | SB 706 Foaming agent[1] (95 g) DC 346 (8.1 g) | 17:1 | 45.4 | uniform, soft, some heavy spots |
| 11 | SB 706 Foaming agent[1] (45 g) DC 346 (8.1 g) water (45 g) | 2:1 | 14.2 | light foam, soft, weak |

The ingredients used in preparing the various foam compositions reflected in TABLE 1 included SB 706, a poly(styrene butadiene) manufactured by NOVEON, a foaming agent manufactured by NOVEON, SB 1168, another poly(styrene butadiene) manufactured by NOVEON, PVA (polyvinyl alcohol), LD 150, a foaming agent, and/or DC 306, a silicone emulsion manufactured by DOW CORNING. Unless otherwise indicated, the blowing agent(s) were included in the foam composition in a 1:15 ratio based on the polymer content.

The performance of exemplary samples of foam coated fiber batts was then compared for the exemplary (coated) and control (uncoated) samples of a number of fiber batts with regard to their dust generation and strength. The dust generation testing was conducted in a rectangular drop box, sealed on four sides, with a vacuum system drawing air down through the batt under test and through an inline filter. The particular fiber batt portion under test, whether exemplary or control, was released and allowed to fall into the drop box, retrieved, rotated, and dropped a second time with the dust collection continuing for 30 seconds after the second drop. The quantity of dust collected on the filter, determined by comparing the pre-collection and post-collection mass of the filter, was then used to generate the data provided below in TABLE 2. As reflected in the data, the foam encapsulation reduced the amount of dust generated by substantially identical fiber batts (i.e., by using the opposite end portions of a single standard fiber batt, one end of which was coated with an encapsulating foam layer).

TABLE 2

| Batt Sample Batt # | Control Filter Wt. Before | Filter Wt. After | Dust | Foam Coated Filter Wt. Before | Filter Wt. After | Dust |
|---|---|---|---|---|---|---|
| 1-1 1 | 3.958 | 4.025 | 0.067 | 3.613 | 3.653 | 0.040 |
| 1-1a 1 | 3.735 | 3.766 | 0.031 | 3.749 | 3.774 | 0.025 |
| 1-2 1 | 3.638 | 3.670 | 0.032 | 3.630 | 3.656 | 0.026 |
| 1-2a 1 | 3.638 | 3.669 | 0.031 | 3.635 | 3.656 | 0.021 |
| 1-3 2 | 3.960 | 4.010 | 0.050 | 3.610 | 3.636 | 0.026 |
| 1-3a 2 | 3.730 | 3.758 | 0.028 | 3.747 | 3.772 | 0.025 |
| 1-4 2 | 3.630 | 3.670 | 0.040 | 3.636 | 3.656 | 0.020 |
| 1-4a 2 | 3.628 | 3.663 | 0.035 | 3.638 | 3.659 | 0.021 |
| 1-5 3 | 3.964 | 4.006 | 0.042 | 3.597 | 3.630 | 0.033 |
| 1-5a 3 | 3.722 | 3.752 | 0.030 | 3.727 | 3.770 | 0.043 |
| 1-6 3 | 3.633 | 3.670 | 0.037 | 3.629 | 3.648 | 0.019 |
| 1-6a 3 | 3.635 | 3.666 | 0.031 | 3.633 | 3.649 | 0.016 |
| | | Average | 0.038 | | Average | 0.026 |
| | | Std Dev | 0.011 | | Std Dev | 0.008 |

The mechanical performance was then evaluated using exemplary (coated) and control (uncoated) samples of a number of fiber batts. The coated and uncoated portions of each test batt were prepared as detailed above. The samples were then compared with respect to their stiffness and resistance to sagging. The fiber batt sample stiffness was evaluated by placing a batt portion in a testing apparatus. Once placed and centered in the testing apparatus, only a narrow middle portion or strip of the fiber batt was resting on a support bar. The unsupported or cantilevered portions of the batt sample were allowed to sag and the resulting angle of deflection was read and recorded. Each batt sample was tested twice, once with each of the major surfaces contacting the support bar. The results of these evaluations are summarized below in TABLE 3. As reflected in the data, the foam encapsulation produced an increase in the stiffness of the fiber batts as reflected in the reduced deflection angle measurements.

TABLE 3

| Sample ID Foam | Stiffness/Sag | | (degrees) | |
|---|---|---|---|---|
| Batt 1-1 Control | 25 | 15 | 15 | 20 |
| Batt 1-1 Sample | 6 | 18 | 6 | 14 |
| Batt 1-2 Control | 25 | 30 | 19 | 32 |
| Batt 1-2 Sample | 22 | 33 | 28 | 25 |
| Batt 1-3 Control | 42 | 40 | 23 | 20 |
| Batt 1-3 Sample | 20 | 10 | 16 | 4 |
| Batt 1-4 Control | 20 | 46 | 29 | 41 |
| Batt 1-4 Sample | 17 | 6 | 23 | 10 |
| Batt 1-5 Control | 21 | 21 | 26 | 15 |
| Batt 1-5 Sample | 26 | 28 | 18 | 25 |
| Batt 1-6 Control | 39 | 45 | 30 | 36 |
| Batt 1-6 Sample | 6 | 20 | 10 | 4 |
| | Avg | Std Dev | | |
| Uncoated (Control) | 28 | 9.9 | | |
| Foam Coated (Exemplary) | 16 | 8.7 | | |

While the present invention has been particularly shown and described with reference to exemplary embodiments thereof, it will be understood by those of ordinary skill in the art that various changes in form and details may be made therein without departing from the spirit and scope of the present invention as defined by the following claims. In particular, it will be appreciated that a range of known conveying mechanisms may be used to achieve the desired positioning and movement of the fiber batt or batts as they advance through the apparatus. Similarly, it will be appreciated that the sequence, timing and specific apparatus used for coating the various surfaces of the fiber batts may be modified to accommodate a wide range of fiber and coating material combinations on a wide variety of manufacturing assemblies.

We claim:

1. A method of forming an encapsulated fiber batt comprising:
   conveying a fiber batt in a first direction, the fiber batt having a first and a second major surface and two minor surfaces, the first and second major surfaces having a substantially horizontal orientation;
   passing the fiber batt past-two or more foam application assemblies, each foam application assembly being arranged and configured to deposit a single polymeric foam layer on different surfaces of the fiber batt; and
   curing the polymeric foams to form a foam layer on each said surface;
   wherein the polymeric foams deposited on each said different surfaces of the fiber batt are different from each other.

2. A method of forming an encapsulated fiber batt according to claim 1, wherein:
   at least one of the polymeric foams is applied to the fiber batt as a foaming mixture, the foaming mixture expanding substantially after being applied to the fiber batt.

3. A method of forming an encapsulated fiber batt according to claim 2, wherein:
   the foaming mixture increases in volume by at least 200% after application to the fiber batt.

4. A method of forming an encapsulated fiber batt according to claim 1, wherein:
   at least one of the polymeric foams is applied to the fiber batt as a foam layer, the foam layer exhibiting only minor expansion after being applied to the fiber batt.

5. A method of forming an encapsulated fiber batt according to claim 4, wherein:
   the foam layer increases in volume by no more than 20% after application to the fiber batt.

6. A method of forming an encapsulated fiber batt according to claim 1, wherein:
   the polymeric foams include at least one polymer selected from water soluble polymers, water soluble prepolymers, water emulsifiable polymers, water emulsifiable prepolymers, water dispersible polymers, and water dispersible prepolymers.

7. A method of forming an encapsulated fiber batt according to claim 6, wherein:
   the polymeric foams include at least one polymer selected from phenolic binders, urea formaldehyde binders, urea extended phenolic binders, polycarboxylic based binders, styrene butadiene rubbers, natural rubbers, polyvinyl chlorides (PVC), polyethylenes (PE), polypropylenes (PP), poly(ethylene-maleic acid) co-polymers, poly(styrene-maleic acid) co-polymers, polyvinyl alcohols (PVA), ethylene/vinyl acetate (EVA), ethylene-propylene copolymers, polyesters, polyethylene terephthalates (PET), nylon polyacrylic acids, polyvinyl acetates, and salts thereof.

8. A method of forming an encapsulated fiber batt according to claim 1, wherein:
   the polymeric foam is deposited on the first major surface and both minor surfaces.

9. A method of forming an encapsulated fiber batt according to claim 1, wherein:
   the polymeric foam is deposited on all exposed surfaces of the fiber batt.

10. A method of forming an encapsulated fiber batt according to claim 1, wherein:
    at least one of the polymeric foams is applied to the fiber batt at a rate measured in mass per batt area, the rate being between about 1 $g/m^2$ and 200 $g/m^2$.

11. A method of forming an encapsulated fiber batt according to claim 10, wherein:
    a first polymeric foam is applied to a first surface of the fiber batt at a first rate $R_1$ measured in mass per batt area, the first rate being between about 1 $g/m^2$ and 200 $g/m^2$; and
    a second polymeric foam is applied to a second surface of the fiber batt at a second rate $R_2$ measured in mass per batt area, the second rate being between about 1 $g/m^2$ and 200 $g/m^2$, said first and second polymeric foams are different from each other;
    wherein $R_1$ and $R_2$ differ by at least 15%.

12. A method of forming an encapsulated fiber batt according to claim 10, wherein:
    a first polymeric foam is applied to a first surface of the fiber batt at a first rate $R_1$ measured in mass per batt area, the first rate being between about 1 $g/m^2$ and 200 $g/m^2$; and
    a second polymeric foam is applied to a second surface of the fiber batt at a second rate $R_2$ measured in mass per batt area, the first rate being between about 1 $g/m^2$ and 200 $g/m^2$, said first and second polymeric foams are different from each other.

13. A method of forming an encapsulated fiber batt according to claim 12, wherein:
    the first and second polymeric foams include different primary polymers.

14. A method of forming an encapsulated fiber batt according to claim 12, wherein:
    the first and second polymeric foams include first and second concentrations of the same primary polymer, the first and second concentrations differing by at least 10%.

15. A method of forming an encapsulated fiber batt according to claim 12, wherein:
    the first polymeric foam has a first blow ratio $BR_1$ of between about 4 and 50; and
    the second polymeric foam has a second blow ratio $BR_2$ of between about 4 and 50; wherein $BR_1$ and $BR_2$ differ by at least about 10%.

16. A method of forming an encapsulated fiber batt according to claim 1, wherein:
    at least one of the polymeric foams has a blow ratio of between about 4 and 50.

17. A method of forming an encapsulated fiber batt according to claim 1, wherein the fiber batt is conveyed past a first foam application assembly depositing a first polymeric foam and a second foam application assembly depositing a second polymeric foam, said first and second polymeric foams including different primary polymers.

18. The method of forming an encapsulated fiber batt according to claim 17, wherein the first polymeric foam forms a first foam layer having a first thickness and the second polymeric foam forms a second foam layer having a second thickness, said first and second thicknesses being the same as or different from each other.

19. A method of forming an encapsulated fiber batt according to claim 1, wherein:
at least one of the first and second polymeric foams is applied to the fiber batt as a foaming mixture, the foaming mixture expanding substantially after being applied to the fiber batt.

20. A method of forming an encapsulated fiber batt according to claim 19, wherein:
the foaming mixture increases in volume by at least 200% after application to the fiber batt.

21. A method of forming an encapsulated fiber batt according to claim 1, wherein:
at least one of the polymeric foams has a blow ratio of between about 4 and 50.

22. A method of forming an encapsulated fiber batt comprising:
passing a fiber batt in a first direction past a foam application assembly, the foam application assembly being arranged and configured to form a polymeric foam on at least one surface of the fiber batt, the fiber batt having first and second major surfaces in a substantially horizontal orientation and two minor surfaces; and
curing the polymeric foam to form a foam layer;
wherein a first polymeric foam is applied to a first surface of the fiber batt at a first rate $R_1$ measured in mass per batt area, the first rate being between about 1 $g/m^2$ and 200 $g/m^2$ and a second polymeric foam is applied to a second surface of the fiber batt at a second rate $R_2$ measured in mass per batt area, the second rate being between about 1 $g/m^2$ and 200 $g/m^2$, said $R_1$ and $R_2$ differing by at least 15%.

23. A method of forming an encapsulated fiber batt according to claim 22, wherein:
at least one of the polymeric foams is applied to the fiber batt as a foam layer, the foam layer exhibiting only minor expansion after being applied to the fiber batt.

24. A method of forming an encapsulated fiber batt according to claim 23, wherein:
the foam layer increases in volume by no more than 20% after application to the fiber batt.

25. A method of forming an encapsulated fiber batt according to claim 22, wherein:
the first and second polymeric foams include different primary polymers.

26. A method of forming an encapsulated fiber batt according to claim 22, wherein:
the first and second polymeric foams include first and second concentrations of the same primary polymer, the first and second concentrations differing by at least 10%.

27. A method of forming an encapsulated fiber batt comprising:
passing a fiber batt in a first direction past a foam application assembly, the foam application assembly being arranged and configured to form a polymeric foam on at least one surface of the fiber batt, the fiber batt having first and second major surfaces in a substantially horizontal orientation and two minor surfaces; and
curing the polymeric foam to form a foam layer;
wherein first polymeric foam is applied to a first surface of the fiber batt, the first polymeric foam having a first blow ratio $BR_1$ of between about 4 and 50;
wherein a second polymeric foam is applied to a second surface of the fiber batt, the second polymeric foam having a second blow ratio $BR_2$ of between about 4 and 50; and
wherein $BR_1$ and $BR_2$ differ by at least about 10%.

28. A method of forming an encapsulated fiber batt according to claim 27, wherein:
the first and second polymeric foams include different primary polymers.

29. A method of forming an encapsulated fiber batt according to claim 27, wherein:
the first and second polymeric foams include first and second concentrations of the same primary polymer, the first and second concentrations differing by at least 10%.

30. A method of forming an encapsulated fiber batt according to claim 27, wherein at least one of the first and second polymeric foams is applied to the fiber batt at a rate measured in mass per batt area, the rate being between about 1 $g/m^2$ and 200 $g/m^2$.

31. A method of forming an encapsulated fiber batt according to claim 27, wherein the first polymeric foam is applied to a first surface of the fiber batt at a first rate $R_1$ measured in mass per batt area, the first rate being between about 1 $g/m^2$ and 200 $gm/m^2$ and the second polymeric foam is applied to a second surface of the fiber batt at a second rate $R_2$ measured in mass per batt area, the second rate being between about 1 $g/m^2$ and 200 $g/m^2$, said $R_1$ and $R_2$ differing by at least 15%.

* * * * *